(12) United States Patent
Suzuki et al.

(10) Patent No.: US 10,006,336 B2
(45) Date of Patent: Jun. 26, 2018

(54) SADDLE-RIDDEN VEHICLE

(71) Applicant: SUZUKI MOTOR CORPORATION, Hamamatsu-shi, Shizuoka (JP)

(72) Inventors: Takaya Suzuki, Hamamatsu (JP); Kazuhiro Okita, Hamamatsu (JP); Shintaro Yagi, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 138 days.

(21) Appl. No.: 15/332,488

(22) Filed: Oct. 24, 2016

(65) Prior Publication Data

US 2017/0114705 A1 Apr. 27, 2017

(30) Foreign Application Priority Data

Oct. 27, 2015 (JP) .................. 2015-210449
Oct. 27, 2015 (JP) .................. 2015-210458
Oct. 27, 2015 (JP) .................. 2015-210459

(51) Int. Cl.

| *F01P 9/02* | (2006.01) |
|---|---|
| *F01P 3/20* | (2006.01) |
| *F01P 11/02* | (2006.01) |
| *F01P 3/18* | (2006.01) |
| *F02B 37/12* | (2006.01) |
| *F02B 61/02* | (2006.01) |
| *F01M 11/03* | (2006.01) |

(52) U.S. Cl.
CPC ............ *F01P 11/029* (2013.01); *F01M 11/03* (2013.01); *F01P 3/18* (2013.01); *F02B 37/12* (2013.01); *F02B 61/02* (2013.01); *F01P 2050/16* (2013.01); *F01P 2070/50* (2013.01)

(58) Field of Classification Search
CPC ...... F02B 37/02; F02B 61/02; F02B 29/0406; F02B 37/12; F01P 3/18; F01P 2050/16; F01P 11/029; F01P 7/16; F01M 5/002; F01M 11/03; F01M 2011/033; F02M 35/10255
USPC .................. 123/41.27, 41.44, 41.57, 41.51
See application file for complete search history.

(56) References Cited

U.S. PATENT DOCUMENTS

| 2006/0251946 A1* | 11/2006 | Makuta ............... H01M 8/2475 429/470 |
| 2006/0278452 A1* | 12/2006 | Shimizu ............ H01M 8/04007 180/68.3 |
| 2015/0275743 A1* | 10/2015 | Ohmori .............. F02B 29/0443 123/563 |

FOREIGN PATENT DOCUMENTS

| JP | 3817110 B2 | 6/2006 |
| JP | 2015-78634 A | 4/2015 |
| JP | 2015-81575 A | 4/2015 |

* cited by examiner

*Primary Examiner* — Syed O Hasan
(74) *Attorney, Agent, or Firm* — Stein IP, LLC

(57) ABSTRACT

A saddle-ridden vehicle includes: an engine; a radiator unit which is disposed in front of the engine and cools cooling water sent from the engine; a supercharger which is disposed between the engine and the radiator unit and compresses air for combustion to be supplied to the engine; and a reservoir tank which is connected to the radiator unit and stores cooling water to flow into the radiator unit, the radiator unit includes a top radiator disposed in top-front of the engine and a bottom radiator disposed below the top radiator, and the reservoir tank is disposed below the supercharger between the engine and the bottom radiator.

12 Claims, 13 Drawing Sheets

SADDLE-RIDDEN VEHICLE

CROSS-REFERENCE TO RELATED APPLICATIONS

This application claims the benefit of Japanese Patent Application JP 2015-210449, filed Oct. 27, 2015, Japanese Patent Application JP 2015-210458, filed Oct. 27, 2015 and Japanese Patent Application JP 2015-210459, filed Oct. 27, 2015, the entire contents of which are hereby incorporated by reference, the same as if set forth at length.

FIELD OF THE INVENTION

The present invention relates to a saddle-ridden vehicle which is equipped with an engine having a supercharger.

BACKGROUND OF THE INVENTION

There are saddle-ridden vehicles such as motorcycles that are equipped with an engine having a supercharger to improve fuel efficiency and increase output power. Such saddle-ridden vehicles are equipped with a radiator for cooling the engine and the supercharger.

For example, Japanese Patent No. 3,817,110 discloses saddle-ridden vehicle which is equipped with a radiator reserve tank (reservoir tank) which is composed of a water tank unit disposed in the bottom-rear of seat rails for supporting a seat and a water supply unit which extends upward from the water tank unit. Cooling water is stored in the water tank unit. The main part of the water tank unit is disposed inside the seat rails. The water supply unit extends from a side portion of the water tank unit to above and outside the seat rails.

JP-A-2015-78634 discloses a motorcycle which is equipped with a radiator disposed in top-front of an engine, a supercharger disposed in bottom-front of the engine, and a waste gate valve for controlling the opening/closure of an exhaust path of the engine. Disposed in the rear of the supercharger, the waste gate valve is protected from being hit by flying water, stones, etc. thrown up by the front tire and coming from the front side.

JP-A-2015-81575 discloses a motorcycle which is equipped with a supercharger disposed in bottom-front of an engine and a radiator disposed above the supercharger. The radiator is shaped like a trapezoid whose top side is longer than its bottom side and is inclined rearward.

SUMMARY OF THE INVENTION

Incidentally, in recent years, saddle-ridden vehicles have come to be equipped with various devices (components) for safety and environmental protection such as an ABS (antilock brake system), a canister, and a muffler with a catalyst. Since in many cases these devices are disposed in spaces located under seat rails, it is becoming difficult to secure a sufficient space for a reservoir tank below the seat rails. Thus, it is difficult for the technique of Japanese Patent No. 3,817,110 to secure a sufficient capacity of a reservoir tank while installing devices for safety and environmental protection nearby.

A first aspect of the present invention has been made to solve the above problem, and an object of the first aspect of invention is therefore to provide a saddle-ridden vehicle capable of being mounted with a reservoir tank having a sufficient capacity.

Since the supercharger, the waste gate valve, and the engine are arranged in the front-rear direction, the technique of JP-A-2015-78634 has a tendency that the overall length and the wheelbase of a vehicle are made long, which means a problem that it is difficult to miniaturize the vehicle.

A second aspect of the invention has been made to solve the above problem, and an object of the second aspect of invention is therefore to provide a saddle-ridden vehicle in which a valve mechanism is protected from being hit by flying water, stones, etc. while the vehicle is miniaturized.

Incidentally, engines having a supercharger which generates a large amount of heat require, in many cases, a large-size radiator which is high is cooling performance. However, if the radiator is widened in, for example, the left-right direction, the overall width of the vehicle is increased, which is an obstruction to size reduction of the vehicle. On the other hand, if the height of the radiator is increased, it comes to be disposed so as to surround the front side of the supercharger. In this case, since the supercharger and the radiator are arranged in the front-rear direction, the overall length and the wheelbase of the vehicle are increased. This not only obstructs miniaturization of the vehicle but also impairs cooling of the supercharger by a travel wind.

A third aspect of the invention has been made to solve the above problem, and an object of the third aspect of invention is therefore to provide a saddle-ridden vehicle that can be miniaturized while the cooling performance of a radiator is kept high.

[First Aspect of the Invention]

A first aspect of the invention provides a saddle-ridden vehicle comprising an engine; a radiator unit which is disposed in front of the engine and cools cooling water sent from the engine; a supercharger which is disposed between the engine and the radiator unit and compresses air for combustion to be supplied to the engine; and a reservoir tank which is connected to the radiator unit and stores cooling water to flow into the radiator unit, wherein the radiator unit comprises a top radiator disposed in top-front of the engine and a bottom radiator disposed below the top radiator; and the reservoir tank is disposed below the supercharger between the engine and the bottom radiator.

With this configuration, the space located below the supercharger between the engine and the bottom radiator can be utilized effectively as an installation space for the reservoir tank. Since the reservoir tank is hidden behind (in the rear of) the bottom radiator, it can be protected from flying water, stones, etc. coming from around a front part of the vehicle.

It is preferable that the supercharger comprise a turbine unit which is disposed in front of a central portion, in the vehicle width direction, of the engine and driven by exhaust gas of the engine, and a compressor unit which is disposed on one side, in the vehicle width direction, of the turbine unit and compresses air using drive force received from the turbine unit; and that the reservoir tank be disposed below the compressor unit.

The temperature of the turbine unit is made very high because it is heated by exhaust gas supplied from the engine. In contrast, the compressor unit is kept lower in temperature than the turbine unit. With this configuration, since the reservoir tank is disposed on the side of the compressor unit whose temperature is kept relatively low, the influence of heat (e.g., thermal deformation of the reservoir tank and temperature increase of the cooling water stored therein) on (the cooling water in) the reservoir tank can be lessened.

It is preferable that the reservoir tank be fixed to the bottom radiator.

With this configuration, since the reservoir tank is attached directly to the bottom radiator, it is possible to dispense with, for example, a component for supporting the reservoir tank so that it is located in its installation space and to hence decrease the number of assembling steps.

It is preferable that the top radiator be narrower than the engine in the vehicle width direction; that the bottom radiator be narrower than the top radiator in the vehicle width direction; and that the reservoir tank be disposed at such a position as to be covered with the bottom radiator when viewed from the front side.

With this configuration, since the reservoir tank goes in the length, in the vehicle width direction (left-right direction), of the bottom radiator, an engine unit including the supercharger can be miniaturized. It is also possible to prevent, for example, an event that impact (external force) directly acts on the reservoir tank from the road surface when the vehicle falls.

It is preferable that the reservoir tank be disposed inside a lower cowl which covers a bottom part of the engine.

With this configuration, since the reservoir tank is covered with the lower cowl, the reservoir tank can be protected from flying water, stones, etc. coming from around a front part of, from below, or from the left side or right side of the vehicle. Furthermore, since the reservoir tank is hidden by the lower cowl, the design performance can be improved.

The first aspect of the invention makes it possible to dispose a reservoir tank having a sufficient capacity.

[Second Aspect of the Invention]

A second aspect of the invention provides a saddle-ridden vehicle comprising an engine; a radiator unit which is disposed in front of the engine and cools cooling water sent from the engine; a supercharger which compresses air for combustion to be supplied to the engine; and a valve mechanism which adjusts the pressure of air compressed by the supercharger, wherein the valve mechanism is disposed under the supercharger between the engine and the radiator unit.

With this configuration, since the supercharger and the valve mechanism are arranged in the vertical direction, the radiator unit can be set closer to the engine than in a case that they are arranged in the front-rear direction, whereby the wheelbase of the saddle-ridden motorcycle can be shortened. Furthermore, since the valve mechanism is hidden behind (in the rear of) the radiator unit, the valve mechanism can be protected from flying water, stones, etc. coming from around a front part of the vehicle.

It is preferable that the radiator unit comprise a top radiator disposed in top-front of the engine and a bottom radiator disposed below the top radiator so as to be spaced from it; and that the valve mechanism be disposed between the engine and the bottom radiator.

With this configuration, since the radiator unit is divided into the top radiator and the bottom radiator, increase in the length in the left-right direction (vehicle width direction) can be prevented while a necessary heat radiation rate (cooling performance of cooling water) is satisfied. Furthermore, since the front side of the valve mechanism is covered with the bottom radiator, the valve mechanism can be protected from flying stones, etc. coming from around a front part of the vehicle.

It is preferable that the top radiator be narrower than the engine in the vehicle width direction; that the bottom radiator be narrower than the top radiator in the vehicle width direction; and that the valve mechanism be disposed at such a position as to be covered with the bottom radiator when viewed from the front side.

With this configuration, since the valve mechanism goes in the length, in the vehicle width direction (left-right direction), of the bottom radiator, an engine unit including the supercharger can be miniaturized.

It is preferable that the saddle-ridden vehicle further comprise an oil filter which is disposed in bottom-front of the engine and filters engine oil to be supplied to the engine; and that the valve mechanism be disposed above the oil filter.

With this configuration, since the valve mechanism is disposed above the oil filter and covered with the radiator unit when viewed from the front side, the valve mechanism can be protected from flying water, stones, etc. coming from around a front part of or from below the vehicle.

It is preferable that the engine comprise a crank case which houses a crank shaft which is rotated by a piston which reciprocates in a cylinder; that the crank case include a balancer room which houses a balancer shaft which suppresses vibration caused by the rotation of the crank shaft; the balancer room project forward from a front portion of the crank case; that part of the supercharger be disposed above the balancer room; and that the valve mechanism be disposed in front of the balancer room.

With this configuration, since the supercharger is disposed in such a manner that part of it avoids (i.e., is located above) the balancer room, the supercharger, the valve mechanism, and the radiator unit can be set closer to the crank case. As a result, the wheelbase of the saddle-ridden motorcycle can be shortened.

It is preferable that the valve mechanism be disposed inside a lower cowl which covers a bottom part of the engine.

With this configuration, since the valve mechanism is covered with the lower cowl, the valve mechanism can be protected from flying water, stones, etc. coming from around a front part of, from below, or from the left side or right side of the vehicle.

The second aspect of the invention makes it possible to protect the valve mechanism from being hit by flying water, stones, etc. while miniaturizing the vehicle.

[Third Aspect of the Invention]

A third aspect of the invention provides a saddle-ridden vehicle comprising an engine; a supercharger which compresses air for combustion to be supplied to the engine; and a radiator unit which cools cooling water sent from the engine, wherein the radiator unit comprises a top radiator disposed in top-front of the engine and a bottom radiator disposed below the top radiator so as to be spaced from it; and the supercharger is disposed between the engine and the radiator unit at such a position as to be seen from the front side through a space between the top radiator and the bottom radiator.

With this configuration, since the radiator unit is divided into the top radiator and the bottom radiator, increase in the length in the left-right direction (vehicle width direction) can be prevented while a necessary heat radiation rate (cooling performance of cooling water) is satisfied. Furthermore, since the supercharger is disposed between the engine and the radiator unit and seen through the space between the two radiators when viewed from the front side, it can receive a travel wind. Thus, the supercharger can be cooled by a travel wind.

It is preferable that a front portion of the supercharger exist in the space between the top radiator and the bottom radiator.

With this configuration, since the front portion of the supercharger exists in the space between the top radiator and the bottom radiator, the radiator unit can be set closer to the engine, whereby the wheelbase of the saddle-ridden motorcycle can be shortened.

It is preferable that the engine comprise a crank case which houses a crank shaft which is rotated by a piston which reciprocates in a cylinder; that the crank case include a balancer room which houses a balancer shaft which suppresses vibration caused by the rotation of the crank shaft; that the balancer room project forward from a front portion of the crank case; and that part of the supercharger be disposed above the balancer room.

With this configuration, since part of the supercharger is disposed above the balancer room, the supercharger and the radiator unit can be set closer to the crank case, whereby the wheelbase of the saddle-ridden motorcycle can be shortened. Since part of the supercharger is disposed above the balancer room, the probability of occurrence of a phenomenon that water thrown up sticks to the supercharger can be lowered. Furthermore, since part of the supercharger is disposed above the balancer room, it is possible to, for example, cause engine oil that has been supplied to (a bearing unit of) the supercharger to drop naturally and return to the crank case (oil pan). This makes it possible to dispense with a mechanism for returning engine oil that has been used for lubrication of the supercharger to the oil pan.

It is preferable that the top radiator be narrower than the engine in the vehicle width direction; that the bottom radiator be narrower than the top radiator in the vehicle width direction; and that the supercharger go in a range that is defined by a length, in the vehicle width direction, of the bottom radiator, when viewed from the front side.

With this configuration, since the supercharger goes in the range that is defined by the length, in the vehicle width direction (left-right direction), of the bottom radiator, an engine unit including the supercharger can be miniaturized.

It is preferable that the top radiator and the bottom radiator be connected to each other by a pair of connection pipes; that one end portions of the pair of connection pipes be connected to bottom surfaces of two end portions, in the vehicle width direction, of the top radiator, respectively, and the other end portions of the pair of connection pipes be connected to two side surfaces, in the vehicle width direction, of the bottom radiator, respectively.

With this configuration, the pair of connection pipes are disposed adjacent to the two sides, in the vehicle width direction, of each radiator, that is, at positions that are distant from the supercharger. As a result, a wide space can be secured in the rear of the radiator unit, which increases the degree of freedom of routing of air intake/exhaust pipes relative to the supercharger.

It is preferable that the saddle-ridden vehicle further comprise a radiator fan which is disposed in the rear of the top radiator; that the supercharger comprise a turbine unit which is driven by exhaust gas of the engine, and a compressor unit which compresses air using drive force received from the turbine unit; that the turbine unit be disposed in front of a central portion, in the vehicle width direction, of the engine; that the compressor unit be disposed on one side, in the vehicle width direction, of the turbine unit; and that the radiator fan be disposed above the turbine unit.

With this configuration, since the radiator fan is disposed on the side of the turbine unit, a wide space can be secured on the compressor unit side of the top radiator, which increases the degree of freedom of routing of pipes to be connected to the compressor unit.

The third aspect of the invention makes it possible to miniaturize the saddle-ridden vehicle while keeping the cooling performance of the radiator unit high.

DESCRIPTION OF SYMBOLS

Figure 1:
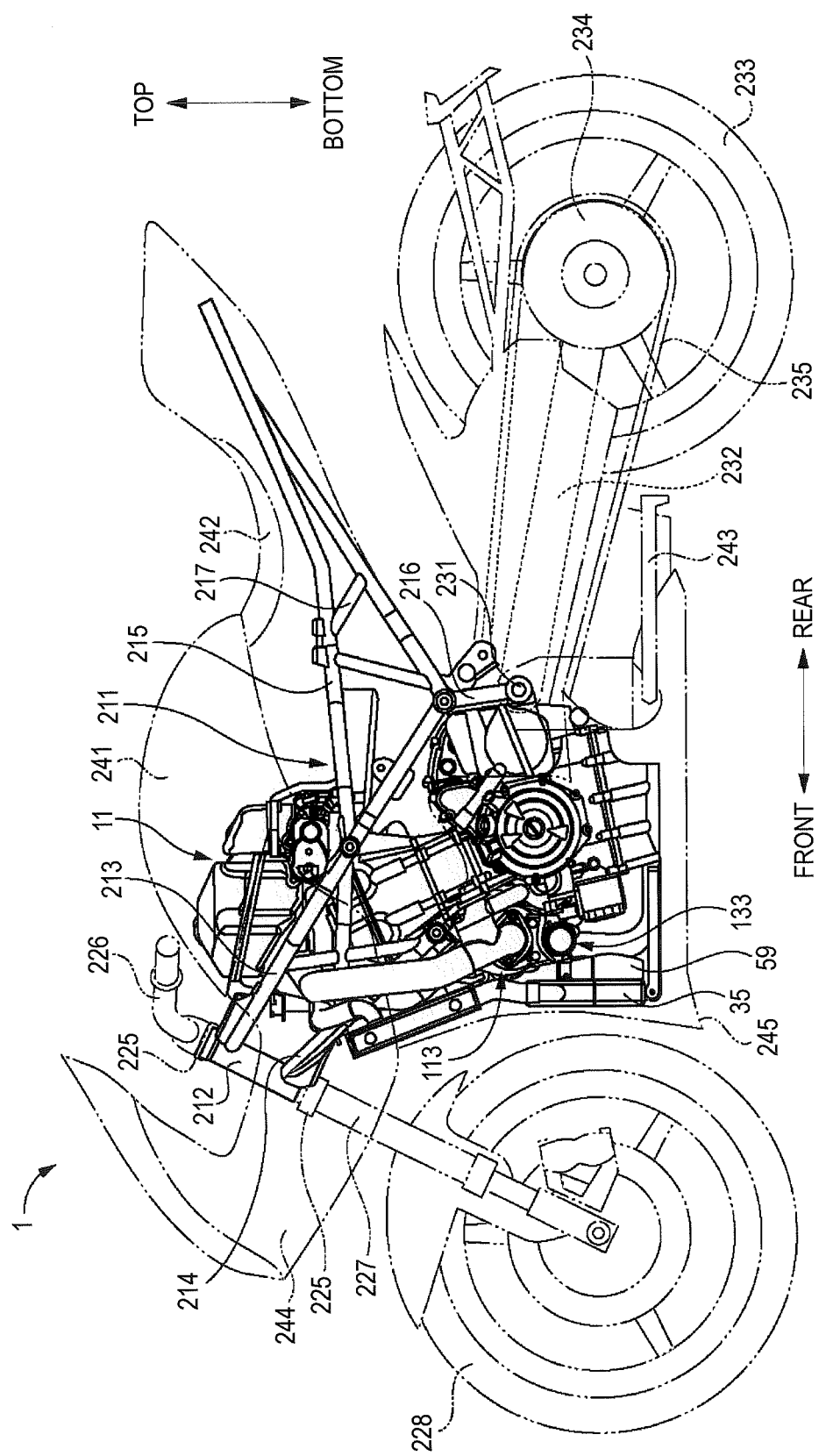
FIG. 1 is a left side view of the motorcycle according to an embodiment of the present invention.

1: Motorcycle (saddle-ridden vehicle)
12: Engine
13: Crank case
14: Cylinder
18: Balancer room
33: Radiator unit
34: Top radiator
34A: Upper pipe (connection pipe)
35: Bottom radiator
35A: Lower pipe (connection pipe)
36: Connecting hose (connection pipe)
40: Radiator fan
59: Reservoir tank
113: Supercharger
114: Turbine unit
115: Compressor unit
133: Waste gate valve (valve mechanism)
245: Lower cowl
G: Space

DETAILED DESCRIPTION OF THE INVENTION

A preferred embodiment of the present invention will be hereinafter described with reference to the accompanying drawings. The forward, rearward, leftward, rightward, upward, and downward directions that will be used in the following description are defined for a rider who is sitting on the seat of a motorcycle.

First, the overall configuration of a motorcycle 1 according to the embodiment of the invention will be described with reference to FIG. 1, which is a left side view of the motorcycle 1.

A vehicle body frame 211 of the motorcycle 1 is constructed by, for example, joining plural steel pipes together. More specifically, the vehicle body frame 211 is equipped with a head pipe 212, a pair of main frames 213, a pair of down tubes 214, a pair of side frames 215, and a pair of pivot frames 216. The head pipe 212 is disposed at a top-front position of the motorcycle 1. The pair of main frames 213 are disposed at left and right positions of the motorcycle 1. Front end portions of the main frames 213 are connected to a top portion of the head pipe 212, and their rear portions extend down rearward. The pair of down tubes 214 are disposed at left and right positions of the motorcycle 1. Front end portions of the down tubes 214 are connected to a bottom portion of the head pipe 212, and their rear portions extend down rearward at a larger inclination than the rear portions of the main frames 213. The pair of side frames 215 are disposed at left and right positions of the motorcycle 1. Front end portions of the side frames 215 are connected to intermediate portions of the down tubes 214, respectively, and their rear portions extend rearward. The pair of pivot frames 216 are joined to rear end portions of the main frames 213, respectively. Reinforcement frames 217 are connected between the main frames 213, the down tubes 214, and the side frames 215.

A steering shaft (not shown) is inserted in the head pipe 212, and is provided with steering brackets 225 at its top and bottom. The top steering bracket 225 is provided with a handlebar 226. Top portions of a pair of (left and right) front fork pipes 227 are supported by the top and bottom steering brackets 225, and a front wheel 228 is supported by bottom end portions of the front fork pipes 227.

A front end portion of a swing arm 232 is disposed between and supported by the pair of (left and right) pivot frames 216 via a pivot shaft 231, and a rear wheel 233 is supported by a rear end portion of the swing arm 232. The shaft of the rear wheel 233 is provided with a driven sprocket 234 on which a chain 235 for transmitting motive power of an engine 12 (described later) is wound.

An engine unit 11 is disposed between the front wheel 228 and the rear wheel 233. The engine unit 11 is mainly disposed between the combination of the left main frame 213 and the left down tube 214 and the combination of the right main frame 213 and the right down tube 214 and is supported by these frames and tubes.

A fuel tank 241 is disposed over the engine unit 11, and a seat 242 is disposed in the rear of the fuel tank 241. A side stand 243 is disposed at a left position of the motor cycle 1 in the bottom-rear of the engine unit 11. An upper cowl 244 is disposed at a top-front position of the motorcycle 1. A lower cowl 245 mainly covers a bottom-front portion of the engine unit 11.

Figure 2:
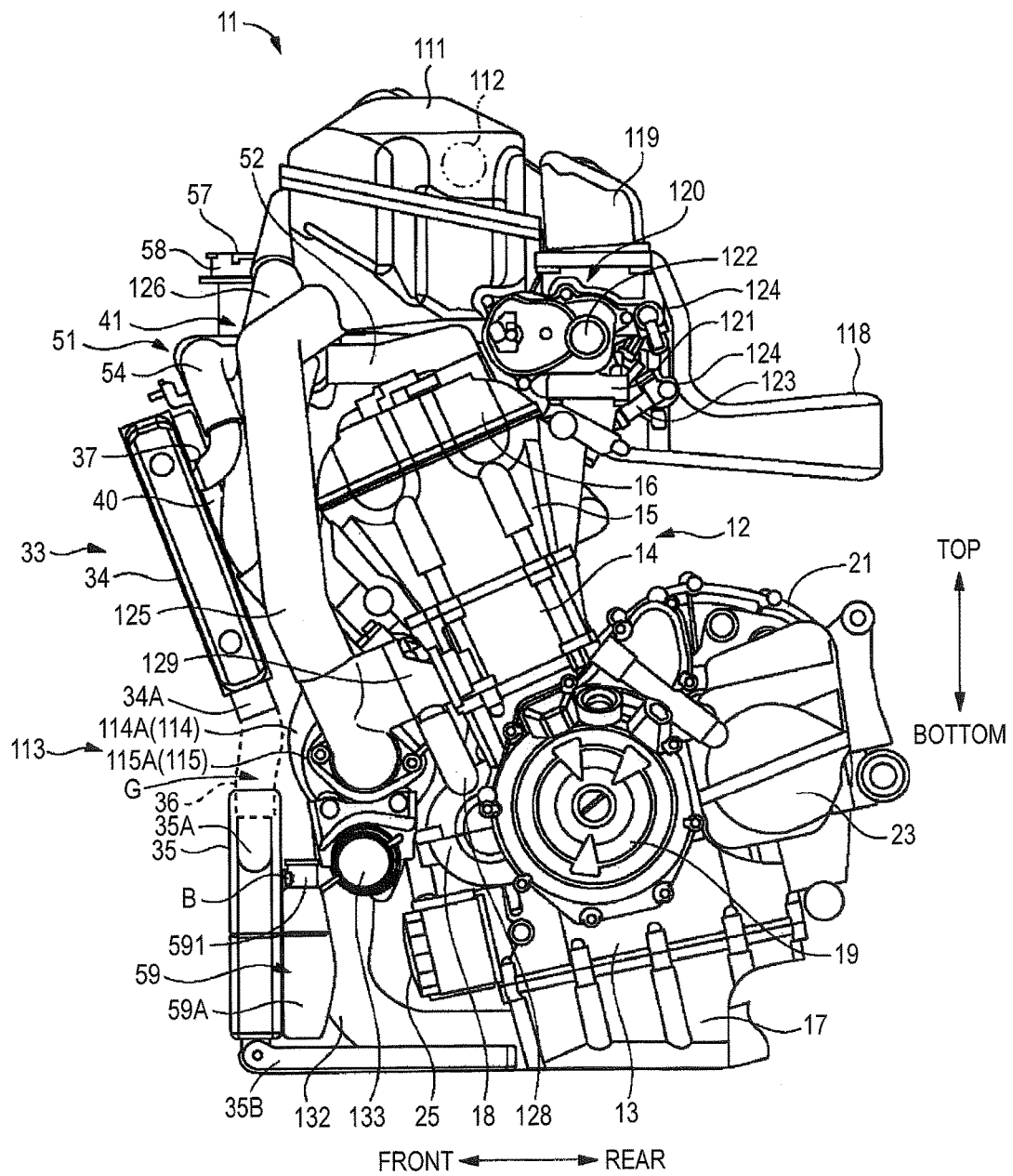
FIG. 2 is a left side view of an engine unit of the motorcycle according to the embodiment.
Figure 3:
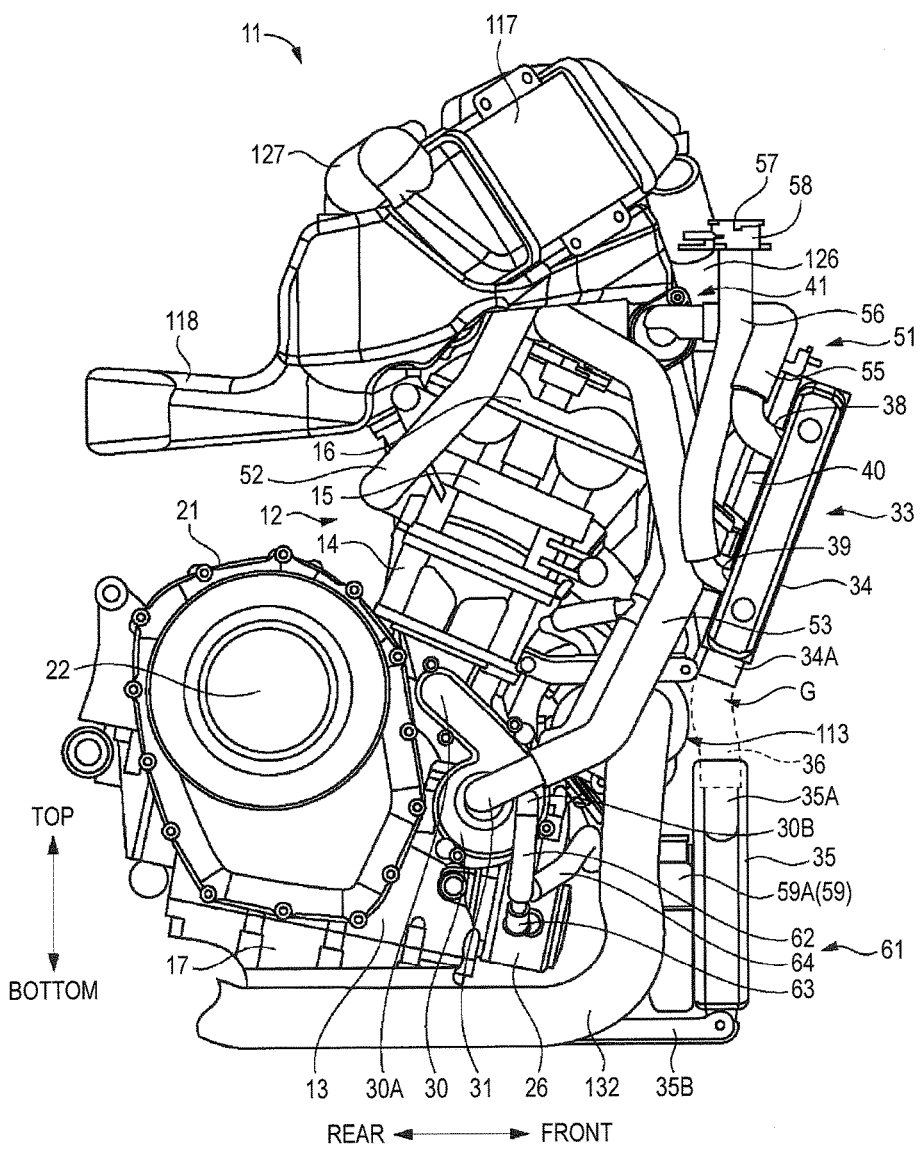
FIG. 3 is a right side view of the engine unit of the motorcycle according to the embodiment.
Figure 4:
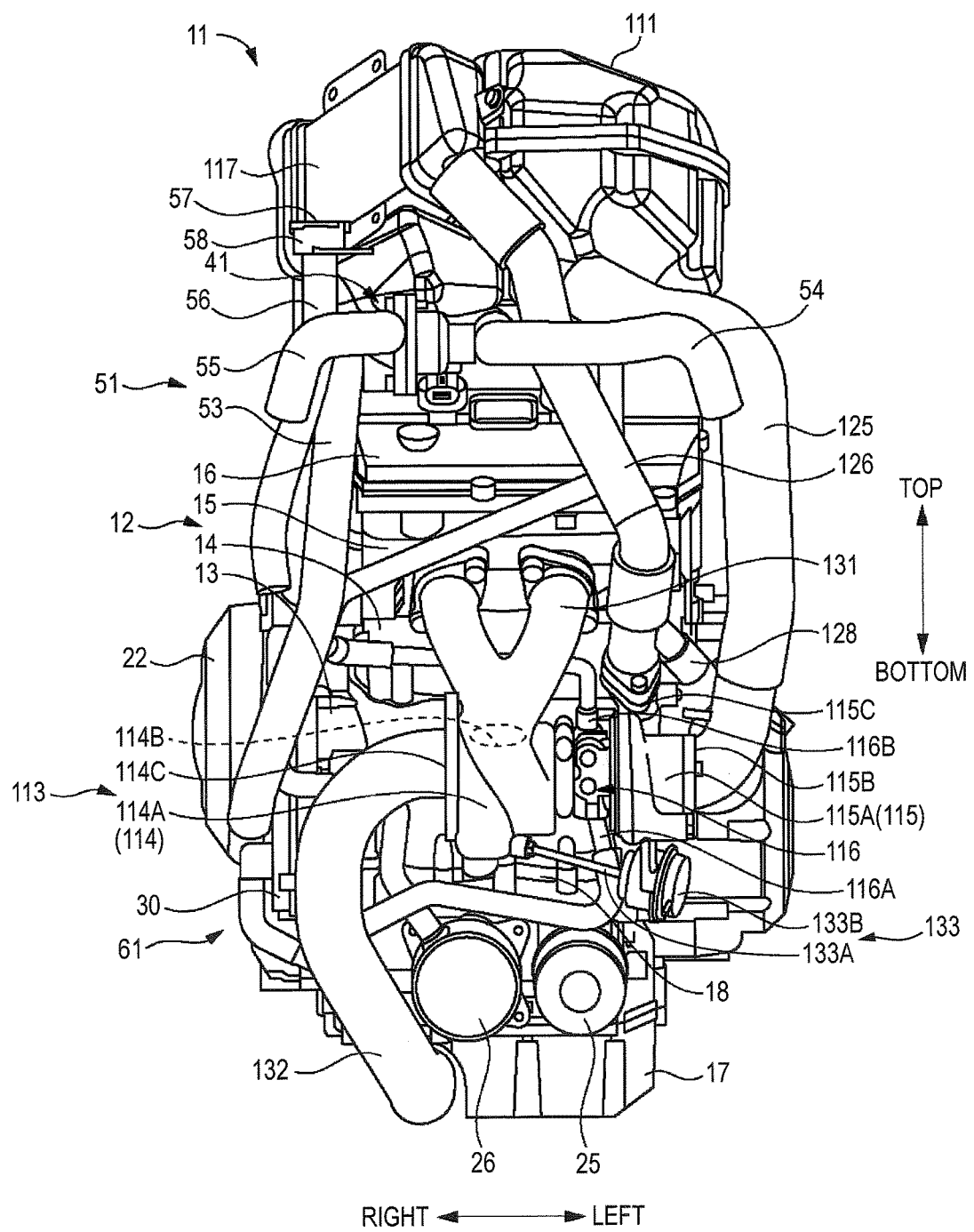
FIG. 4 is a front view of the engine unit, excluding a radiator unit, of the motorcycle according to the embodiment.
Figure 5:
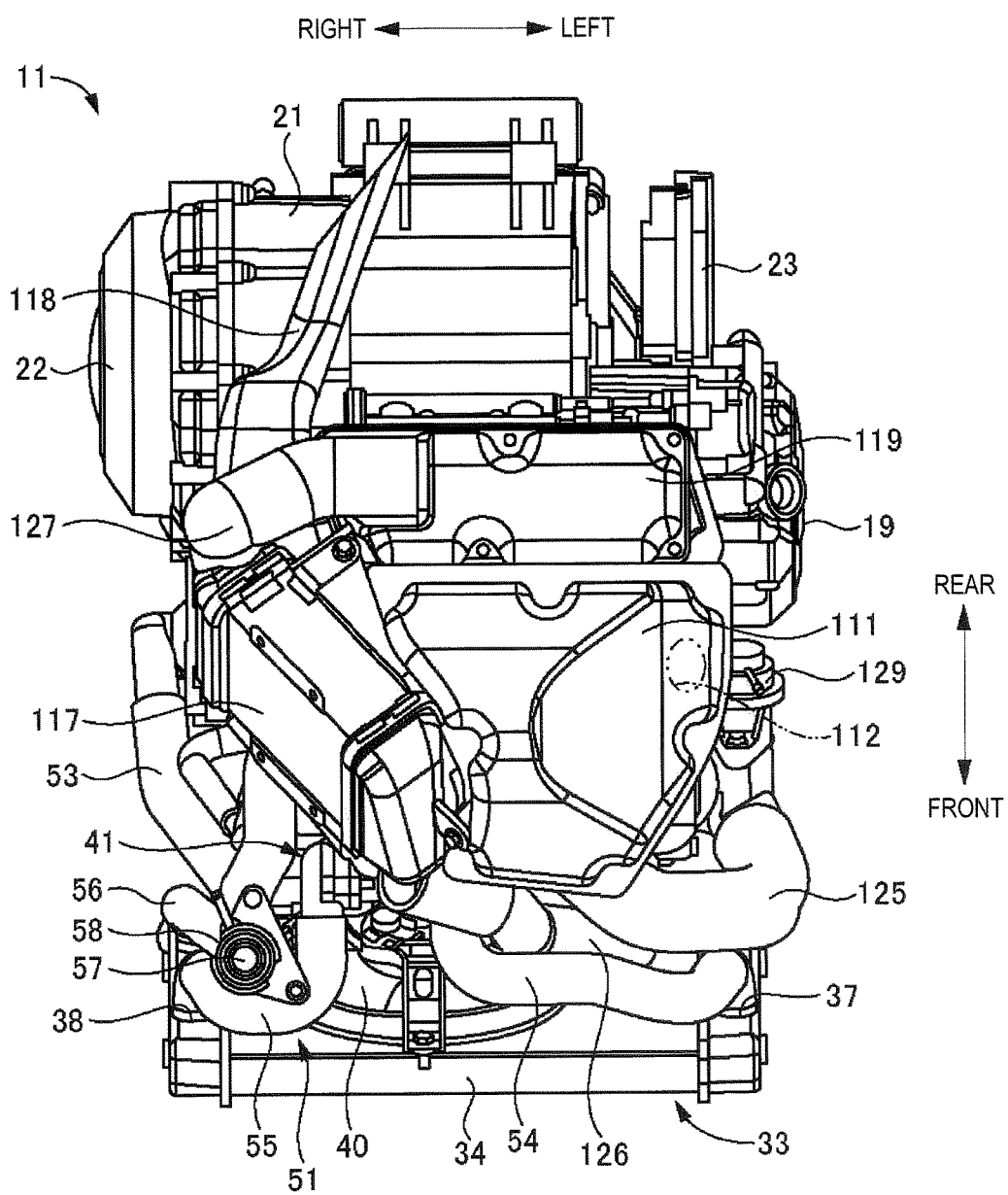
FIG. 5 is a plan view of the engine unit of the motorcycle according to the embodiment.
Figure 6:
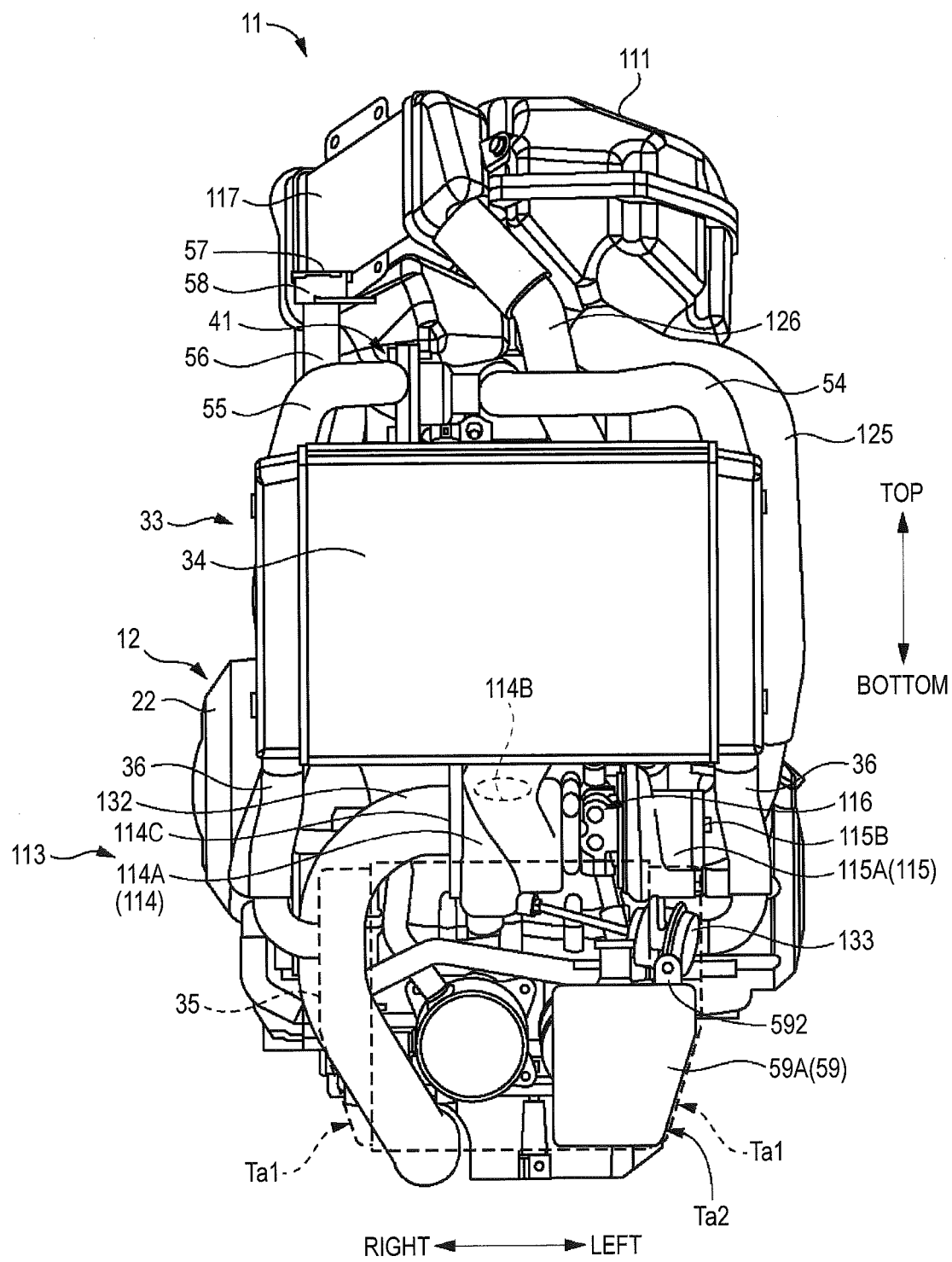
FIG. 6 is a front view of the engine unit, including the radiator unit, of the motorcycle according to the embodiment.
Figure 7:
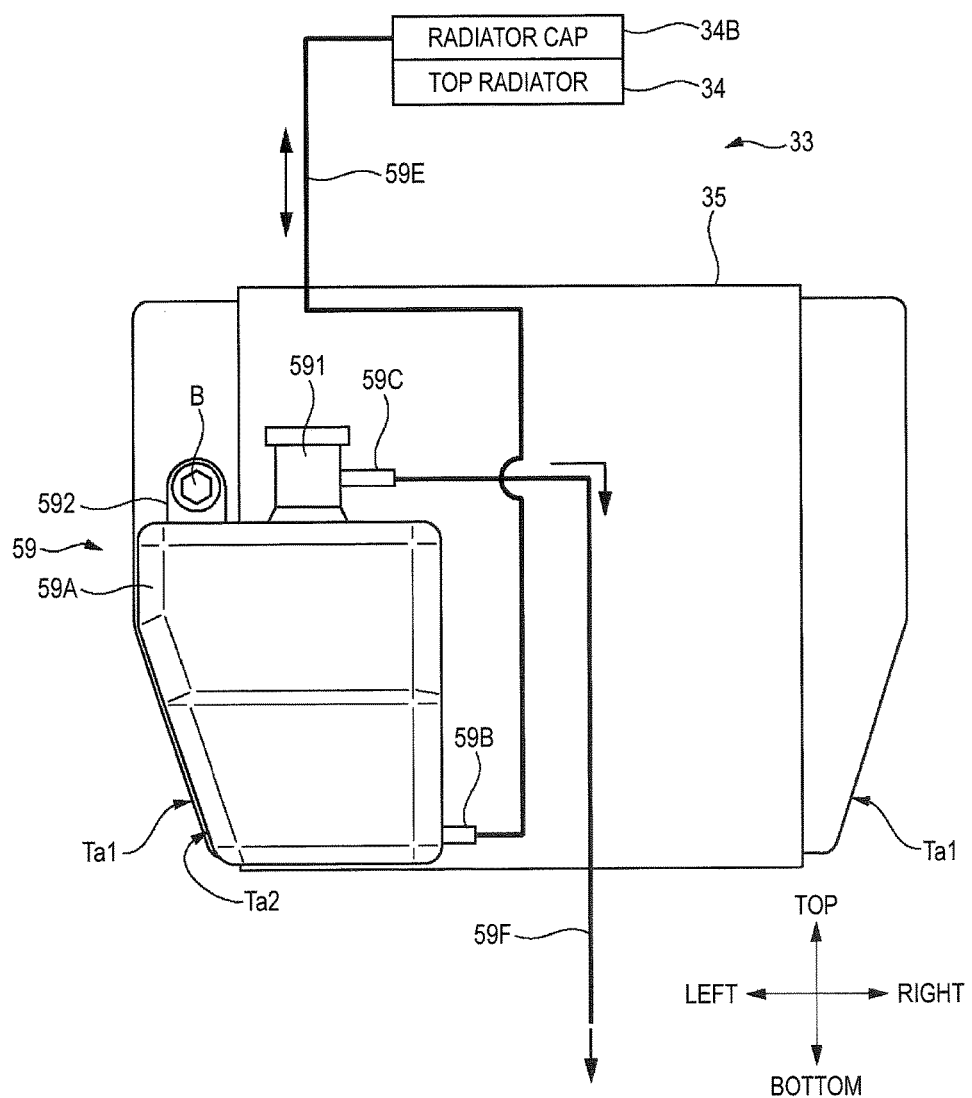
FIG. 7 is a rear view showing a bottom radiator, a reservoir tank, etc. of the motorcycle according to the embodiment.
Figure 8:
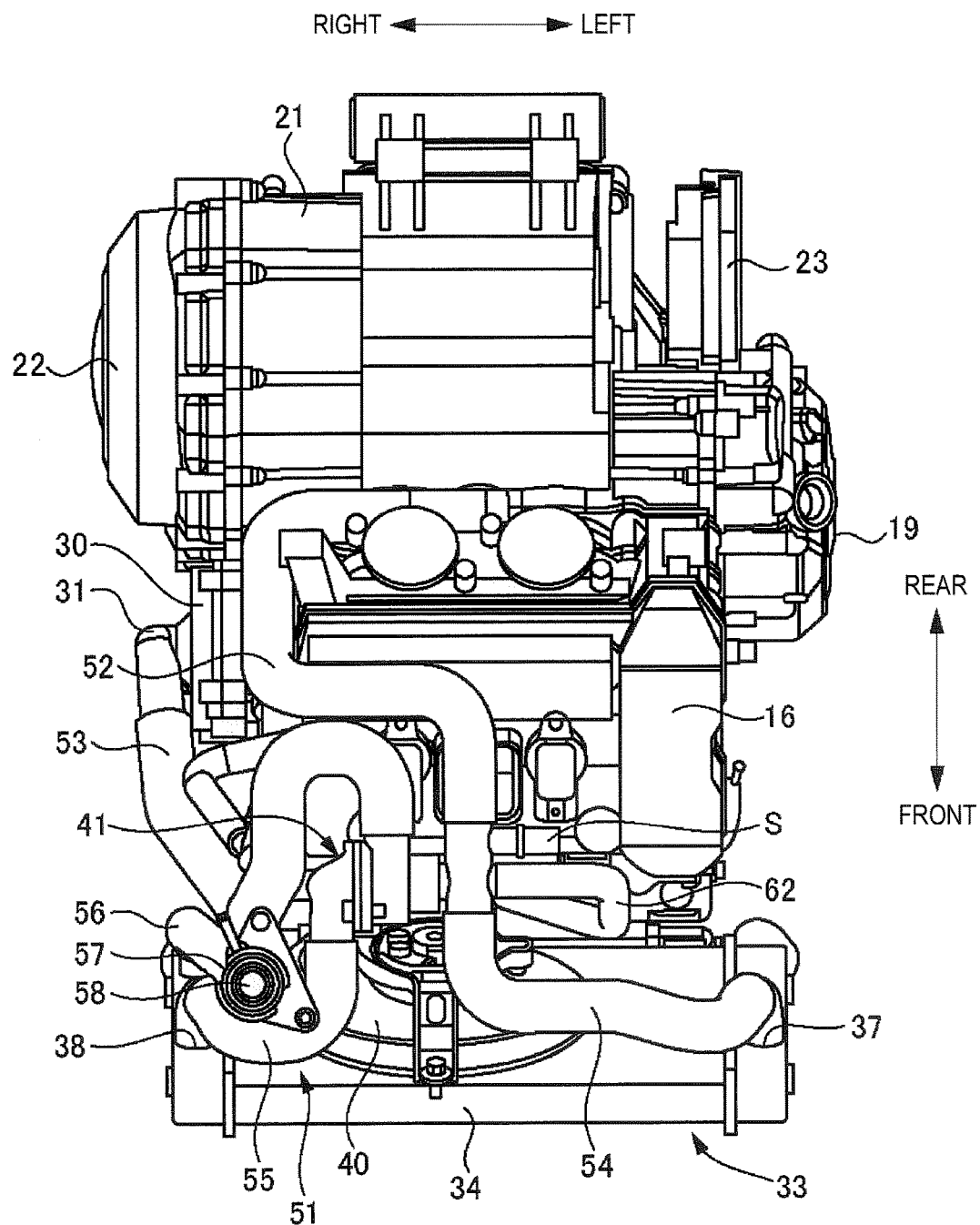
FIG. 8 is a plan view of an engine and a cooling system of the motorcycle according to the embodiment.
Figure 9:
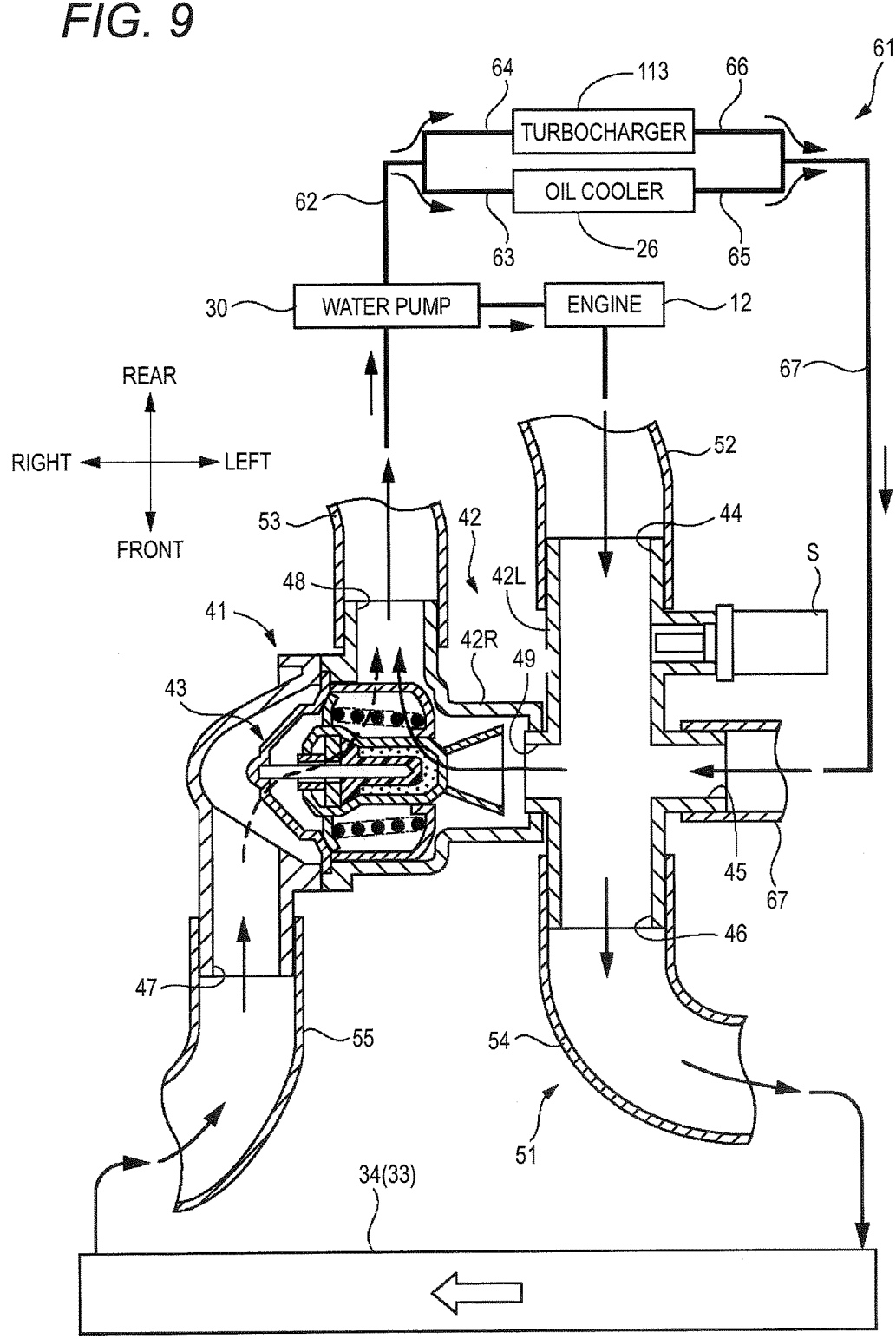
FIG. 9 is a sectional view schematically showing the cooling system of the engine unit of the motorcycle according to the embodiment.
Figure 10:
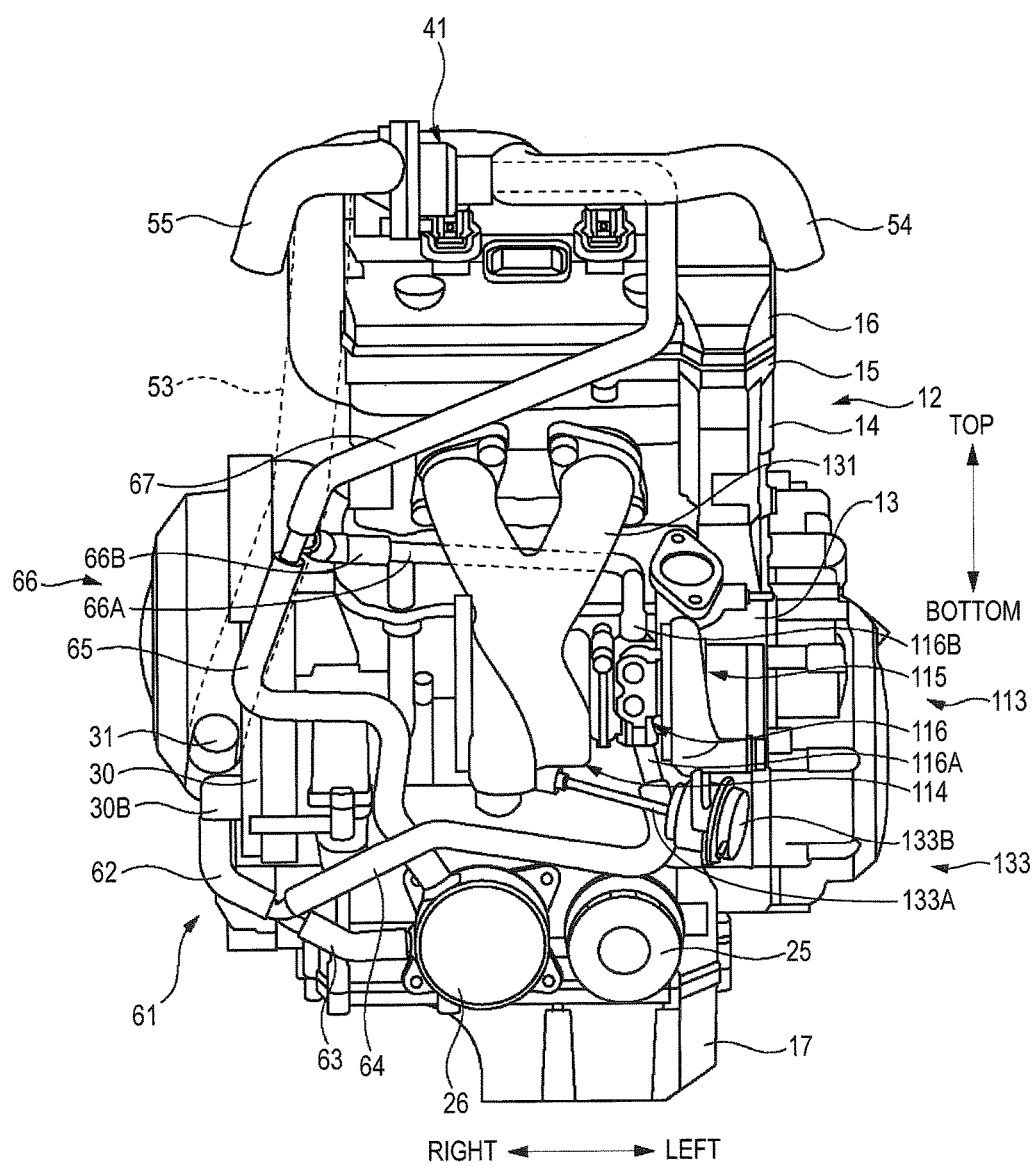
FIG. 10 is a front view of the engine and cooling tubing of the motorcycle according to the embodiment.

Next, the engine unit 11 will be described with reference to FIGS. 2-10. FIG. 2 is a left side view of the engine unit 11 and FIG. 3 is a right side view of the engine unit 11. FIG. 4 is a front view of the engine unit 11 excluding a radiator unit 33. FIG. 5 is a plan view of the engine unit 11. FIG. 6 is a front view of the engine unit 11 including the radiator unit 33. FIG. 7 is a rear view showing a bottom radiator 35, a reservoir tank 59, etc. FIG. 8 is a plan view of the engine 12 and a cooling system. FIG. 9 is a sectional view schematically showing the cooling system of the engine unit 11. FIG. 10 is a front view of the engine 12 and cooling tubing 61.

The engine unit 11 is equipped with the engine 12, part of a drive system, such as a primary speed reducer, a clutch, and a transmission, for transmitting motive power of the engine 12 to the rear wheel 233, a lubrication system for lubricating movable portions of the engine 12, an air intake system (including a supercharger 113) for supplying an air-fuel mixture to the engine 12, part of an exhaust system for discharging exhaust gas generated by combustion of an air-fuel mixture from the engine 12, a cooling system for cooling the engine 12 etc., an AC generator for generating electric power using rotation of a crank shaft, and other things.

The engine 12 used in the embodiment is, for example, a water-cooling, parallel 2-cylinder, 4-cycle gasoline engine. As shown in FIGS. 2 and 3, the engine 12 has a crank case 13 which houses the crank shaft, cylinders 14 disposed on top of the crank case 13, a cylinder head 15 disposed on top of the cylinders 14, and a cylinder head cover 16 disposed on top of the cylinder head 15.

An oil pan 17 for storing engine oil is disposed under the crank case 13. The cylinder axes of the engine 12 are inclined so as to extend up forward. In the crank case 13, the crank shaft is rotated by pistons (not shown) which reciprocate in the respective cylinders 14. A balance shaft (not shown) for suppressing vibration produced by the rotation of the crank shaft (i.e., the movements of the pistons) is also disposed in the crank case 13. The balance shaft is located in front of the crank shaft and housed in a balancer room 18 (see FIG. 2) which projects forward from a front portion of the crank case 13. The balancer room 18 is formed by swelling part of a front wall of the crank case 13 forward and is thus integral with the crank case 13. A magnet room 19 (see FIG. 2) is attached to a left portion of the crank case 13 and houses the AC generator (not shown).

Part of the drive system of the engine unit 11 is disposed in the rear of the engine 12. More specifically, a transmission case 21 is integral with rear portions of the crank case 13 and the cylinders 14 and houses the primary speed reducer and the transmission. As shown in FIG. 3, a clutch cover 22 which covers the clutch is attached to a right portion of the transmission case 21. As shown in FIG. 2, a sprocket cover 23 which covers a drive sprocket is attached to a left portion of the transmission case 21. As shown in FIG. 1, the chain 235 for transmitting drive power of the engine 12 to the rear wheel 233 is wound on the drive sprocket.

As shown in FIGS. 2-4, the lubrication system of the engine unit 11 is equipped with an oil pump (not shown), an oil filter 25, and a water-cooling type oil cooler 26. The oil pump pumps up engine oil stored in the oil pan 17 of the engine 12 and supplies it to individual portions of the engine 12. The oil filter 25 filters engine oil being supplied to the engine 12. The oil cooler 26 cools engine oil being supplied to the engine 12. As shown in FIG. 4, the oil filter 25 and the oil cooler 26 are arranged in the left-right direction (vehicle width direction) on the two respective sides of the vertical center line in front of a bottom end portion of the engine 12 (below the balancer room 18). More specifically, the oil filter 25 and the oil cooler 26 are disposed on the left and right of the center of the crank case 13, respectively.

As shown in FIGS. 2-5, the air intake system of the engine unit 11 is equipped with an air cleaner 111, the supercharger 113, an intercooler 117, an exhaust wind duct 118, a surge tank 119, the electronically controlled throttle device 120, and injectors 123.

As shown in FIGS. 4 and 5, the air cleaner 111 is disposed on the top-left of the engine 12. The air cleaner 111, which is a device for filtering air that is taken in from outside, is provided with an air filter (not shown) inside. Although in FIGS. 2 and 5 an air inlet 112 of the air cleaner 111 is indicated schematically by a two-dot chain line, the position of the air inlet 112 may be set as appropriate. The air inlet 112 is provided with an air duct (not shown) for guiding external air to the air cleaner 111.

As shown in FIGS. 2-4, the supercharger 113 is disposed between the engine 12 and the radiator unit 33 above the oil cooler 26 etc. (Part of) a top portion of the supercharger 113 is disposed above the balancer room 18. The supercharger 113 compresses air for combustion to be supplied to the engine 12.

As shown in FIGS. 2, 4, and 6, the supercharger 113 is equipped with a turbine unit 114, a compressor unit 115, and a bearing unit 116. The turbine unit 114 is driven by exhaust gas of the engine 12. The compressor unit 115 compresses air using drive force received from the turbine unit 114. The bearing unit 116 has a function of cooling the supercharger 113 by passage of cooling water through it.

The turbine unit 114 is disposed in front of an approximately central portion, in the left-right direction (vehicle width direction), of the engine 12. The turbine unit 114 includes a turbine wheel (not shown) which is supported rotatably inside a turbine housing 114A which is approximately cylindrical. An exhaust gas inflow portion 114B is formed above the turbine housing 114A, and an exhaust gas outflow portion 114C is formed on the right of the turbine housing 114A. The turbine unit 114 is equipped with a waste gate valve 133 for adjusting the boost pressure. The waste gate valve 133 extends leftward from a bottom-left side surface of the turbine housing 114A.

The compressor unit 115 is disposed on the left ("on one side in the vehicle width direction" (a term used in the claims)) of the turbine unit 114. The compressor unit 115 includes a compressor impeller (not shown) which is supported rotatably inside a compressor housing 115A which is approximately cylindrical. As shown in FIG. 4, an air inflow portion 115B is formed on the left of the compressor housing 115A and an air outflow portion 115C is formed over the compressor housing 115A. The compressor unit 115 may be disposed on the right of the turbine unit 114.

As shown in FIGS. 4 and 6, the bearing unit 116 is disposed between the turbine unit 114 and the compressor unit 115. The bearing unit 116 includes a bearing (not shown) which supports the turbine wheel and the compressor impeller pivotally at a position between them. Engine oil is supplied to the bearing unit 116 by driving the oil pump. And cooling water is supplied to the bearing unit 116 by driving a water pump 30 (described later).

As shown in FIGS. 2 and 4, (part of) a top portion of the supercharger 113 is located above the balancer room 18. More specifically, a top portion of the turbine unit 114, the compressor unit 115, and the bearing unit 116 are located above the balancer room 18.

As shown in FIGS. 2, 4, and 6, and FIG. 12 which is the same as FIG. 6 except that the reservoir tank 59 is omitted, the waste gate valve 133 which is a valve mechanism is disposed under the supercharger 113 (in front of the balancer room 18). More specifically, the waste gate valve 133 is disposed above the oil filter 25 in front of the balancer room 18.

The waste gate valve 133 adjusts the pressure (boost pressure) of air compressed by the supercharger 113. The waste gate valve 133 includes a link rod 133A and an.

The link rod 133A extends leftward from a bottom-left side surface of the turbine housing 114A. The link rod 133A is connected to a bypass valve (not shown) which is disposed inside the turbine housing 114A. The bypass valve is provided to guide, to the exhaust system, part of exhaust gas of the engine 12 without causing it to flow into the turbine housing 114A. The actuator unit 133B is fixed to an extension tip portion of the link rod 133A. A spring (not shown) which is deformed elastically in link with a boost pressure variation is disposed inside the actuator unit 133B. The waste gate valve 133 adjusts the boost pressure by opening or closing the bypass valve.

As shown in FIGS. 3-5, the intercooler 117 is disposed on the top-right of the engine 12. The intercooler 117 is a device for cooling air that has been compressed and increased in temperature by the compressor unit 115 of the supercharger 113. The exhaust wind duct 118 for discharging, to the outside, air (exhaust wind) that has passed through the intercooler 117 is disposed in the vicinity of the intercooler 117. As seen from FIGS. 2 and 5, the surge tank 119 is disposed in the top-rear of the engine 12. The surge tank 119 is a device for rectifying a flow of air that has been cooled by the intercooler 117. As shown in FIG. 5, a connecting pipe 127 connects the intercooler 117 and the surge tank 119. The connecting pipe 127 is disposed above and on the rear-right of the engine 12.

The electronically controlled throttle device 120 is a device for adjusting the rate of supply of air to the air intake ports of the engine 12 via the intercooler 117. As shown in FIG. 2, the electronically controlled throttle device 120 is equipped with throttle bodies 121, throttle valves (not shown) each of which is disposed inside the associated throttle body 121 and opens or closes an air intake passage formed inside the throttle body 121, and a drive motor 122 for driving the throttle valves. The throttle bodies 121 are disposed in the top-rear of the engine 12 between the surge tank 119 and the air intake ports of the engine 12.

The injectors 123 are devices for injecting fuel into the respective intake air ports of the engine 12. Delivery pipes 124 for supplying fuel from the fuel tank 241 to the respective injectors 123 are connected to the injectors 123.

As shown in FIGS. 4 and 5, an air intake pipe 125 connects the air cleaner 111 and the compressor unit 115 (air inflow portion 115B) of the supercharger 113. The air intake pipe 125 is disposed on the front-left of the engine 12. An air outlet pipe 126 connects the compressor unit 115 (air outflow portion 115C) of the supercharger 113 and the intercooler 117. The air outlet pipe 126 is disposed on the front-left of the engine 12 on the right of the air intake pipe 125. An air bypass passage 128 which connects the air intake pipe 125 and the air outlet pipe 126 is disposed in the vicinity of the compressor unit 115 (see FIGS. 2 and 4). An air bypass valve 129 for switching between passage and shutoff of the air bypass passage 128 is disposed at a halfway position of the air bypass passage 128 (see FIGS. 2 and 5).

As shown in FIG. 4, the exhaust system of the engine unit 11 is equipped with an exhaust pipe 131, a muffler joint pipe 132, a muffler (not shown), etc.

The exhaust pipe 131 connects the engine 12 and the supercharger 113. The exhaust pipe 131 branches off on one side (upstream side) into two pipes which are connected to a pair of (left and right) exhaust ports (not shown) formed in a front portion of the engine 12, respectively. On the other side (downstream side), the exhaust pipe 131 (single pipe) is connected to the exhaust gas inflow portion 114B of the turbine unit 114. In the embodiment, the exhaust pipe 131 is integral with the turbine housing 114A of the turbine unit 114. Alternatively, the exhaust pipe 131 may be a member that is separate from the turbine housing 114A and is connected to the turbine housing 114A.

The muffler joint pipe 132 connects the supercharger 113 and the muffler. One end portion (upstream end portion) of the muffler joint pipe 132 is connected to the exhaust gas outflow portion 114C of the turbine unit 114. The other end portion (downstream end portion) of the muffler joint pipe 132 passes by a bottom-right portion of the engine 12 and extends rearward toward the muffler (see FIG. 3).

Exhaust gas of the engine 12 is supplied from each exhaust port to the turbine unit 114 (to the inside of the turbine housing 114A) of the supercharger 113 via the exhaust pipe 131. The exhaust gas supplied to the inside of the turbine housing 114A rotates the turbine wheel. Then the exhaust gas is output from the exhaust gas outflow portion 114C, passes through the muffler joint pipe 132, and is discharged to the outside from the muffler. The turbine unit 114 is equipped with a bypass valve (not shown) for causing part of exhaust gas to flow from the exhaust pipe 131 to the muffler joint pipe 132 without passing through the turbine housing 114A. The above-mentioned waste gate valve 133 adjusts the inflow rate (boost pressure) of exhaust gas to be supplied to the turbine unit 114 by adjusting the degree of opening of the bypass valve.

The turbine wheel of the turbine unit 114 is rotated by exhaust gas that is supplied to the inside of the turbine housing 114A. The rotational power of the turbine wheel rotates the compressor impeller of the compressor unit 115 via the bearing unit 116. The temperature of the turbine unit 114 becomes very high being heated by exhaust gas supplied from the engine 12. In contrast, the temperature of the compressor unit 115 is kept lower than that of the turbine unit 114.

Air for engine combustion is supplied from the air cleaner 111 to the compressor unit 115 (to the inside of the compressor housing 115A) of the supercharger 113 via the air intake pipe 125. The air supplied to the inside of the compressor housing 115A is compressed by the compressor impeller that is rotating. The compressed air is output from the air outflow portion 115C, passes through the air outlet pipe 126, and is supplied to the intercooler 117. The compressed air is cooled by the intercooler 117, passes through the connecting pipe 127, the surge tank 119, and the throttle bodies 121 of the electronically controlled throttle device 120 in this order, and is supplied to the air intake ports of the engine 12.

As shown in FIG. 3, the cooling system of the engine unit 11 is equipped with a water jacket (not shown), the water pump 30, the radiator unit 33, a cooling water flow control unit 41, main tubing 51, and the cooling tubing 61.

The water jacket is provided for the cylinders 14 and the cylinder head 15, which are cooled by cooling water flowing through the water jacket.

The water pump 30 is attached to a right portion of the crank case 13 (see FIG. 4), and is provided with a pump inlet 31. The water pump 30 is formed with a supply portion 30A for supplying cooling water to the water jacket. The water pump 30 is provided with a cooling water discharge outlet 30B at a front position. The water pump 30 operates using rotation of the crank shaft and thereby feeds cooling water to the engine 12 etc.

As shown in FIGS. 2, 3, and 6, the radiator unit 33 is disposed in front of the engine 12 and the supercharger 113. The radiator unit 33 cools cooling water that is supplied from the engine 12 by receiving a travel wind or driving a radiator fan 40.

The radiator unit 33 has a top radiator 34 and a bottom radiator 35. The top radiator 34 is disposed in top-front of the engine 12. The bottom radiator 35 is separated from and is disposed below the top radiator 34. The top radiator 34 and the bottom radiator 35 are connected to each other by a pair of (left and right) connecting hoses 36. A flow passage (not shown) through which cooling water is to flow to dissipate heat from itself to the ambient air. In FIG. 6, the bottom radiator 35 is drawn by broken lines.

The top radiator 34 is approximately shaped like a rectangular parallelepiped that is thin in the front-rear direction and long in the left-right direction. The top radiator 34 is narrower than the engine 12 (crank case 13) in the left-right direction (see FIG. 6), and is supported by a vehicle body frame 211 so as to be inclined forward (see FIGS. 2 and 3). The rear surface of the top radiator 34 is formed with a radiator inlet 37 at a top-left position (see FIGS. 2 and 5) and with a radiator outlet 38 at a top-right position (see FIGS. 3 and 5). The radiator inlet 37 and the radiator outlet 38 communicate with the flow passage formed inside the top radiator 34. A pair of (left and right) upper pipes 34A project from the bottom surface of the top radiator 34 at two respective ends in the left-right direction, and communicate with the flow passage formed inside the top radiator 34. The rear surface of the top radiator 34 is provided with the radiator fan 40 at a position that is a little deviated rightward from the vertical center line (see FIG. 5).

The bottom radiator 35 is approximately shaped like a rectangular parallelepiped that is thin in the front-rear direction and long in the left-right direction. More correctly, the bottom radiator 35 has tapered surfaces Ta1 at bottom-left and bottom-right positions and is thus shaped like a hexagon (see FIGS. 6 and 7). The bottom radiator 35 is narrower than the top radiator 34 in the left-right direction (see FIG. 6), and extends vertically when viewed from the side (see FIGS. 2 and 3). The bottom radiator 35 is supported by the engine 12 via a bracket (not shown). A stay 35B which supports the top radiator 34 is disposed between the bottom surface of the top radiator 34 and the oil pan 17.

The left and right side surfaces of the bottom radiator 35 are provided with a pair of lower pipes 35A, respectively. Each of the pair of lower pipes 35A extends outward from the side surface of the bottom radiator 35 and then bent upward, so as to assume approximately an L shape (see FIG. 13 which is different from FIG. 6 in that the bottom radiator 35 is shown). The lower pipes 35A communicate with a flow passage formed inside the bottom radiator 35.

The top radiator 34 and the bottom radiator 35 are separated from each other in the vertical direction and connected to each other by the pair of (left and right) connecting hoses 36. Top end portions and bottom end portions of the pair of hoses 36 are connected to the pair of upper pipes 34A and the pair of lower pipes 35A, respectively. The upper pipes 34A, the lower pipes 35A, and the connecting hoses 36 are examples of the term "connection pipes" used in the claims.

Because of the use of the radiator unit 33 which is divided into the top radiator 34 and the bottom radiator 35, increase in the width in the left-right direction (vehicle width direction) can be prevented while a necessary heat radiation rate (cooling performance of cooling water) is satisfied. As shown in FIG. 3, the rear surface of the top radiator 34 is formed with, at a bottom-right position, a cooling water supply inlet 39 to which a water injection hose 56 extending upward is connected. A top end portion of the water injection hose 56 is provided with cooling water injection portion 58 having a cooling water injection inlet 57.

As shown in FIGS. 2, 6, and 7, the reservoir tank 59 is fixed to the bottom radiator 35. Connected to the radiator unit 33, the reservoir tank 59 stores cooling water to flow through the radiator unit 33.

As shown in FIG. 7, the reservoir tank 59 has a tank main body 59A, a tank inlet 59B, and a tank outlet 59C. The reservoir tank 59 is an integral body made of a synthetic resin, for example.

The tank body 59A is shaped approximately like a rectangular parallelepiped which is thin in the front-rear direction and long in the vertical direction. More specifically, a bottom portion of the left side surface of the tank main body 59A is a tapered surface Tat and is thus shaped like a pentagon when view from the front side or the rear side. A tank injection inlet 591 for replenishment of cooling water is erected from the top surface of the tank main body 59A. The tank injection inlet 591 is cylindrical and is fitted with a cap (not shown). An attachment piece 592 in which an attachment bolt B is inserted projects from the tank main body 59A on the left of the tank injection inlet 591. How the reservoir tank 59 (tank main body 59A) is disposed will be described later in detail.

The tank inlet 59B is approximately cylindrical and projects from the right side surface of the tank main body 59A at a bottom position. The tank inlet 59B communicates with the inside of the tank main body 59A. A reserve tube 59E is connected between the tank inlet 59B and a radiator cap 34B of the top radiator 34. Including a pressure valve (not shown), the radiator cap 34B prevents boiling of cooling oil (i.e., increasing its boiling temperature) by applying pressure in the radiator unit 33 (cooling water circulation path). The radiator cap 34B may be disposed independently at a position that is distant from the radiator unit 33. The reserve tube 59E may be connected to the tank injection inlet 591.

The tank outlet 59C projects rightward from the side surface of the tank injection inlet 591. One end portion (upstream end portion) of an overflow tube 59F is connected to the tank outlet 59C. The other end portion (downstream end portion) of the overflow tube 59F is open at a bottom position of the vehicle.

As shown in FIGS. 6 and 8, the cooling water flow control unit 41 is disposed above and on the front-right of the cylinder head cover 16. The cooling water flow control unit 41 is provided to adjust the flow rate of cooling water to flow through the radiator unit 33 according to the cooling water temperature and thereby keep the cooling water temperature at a prescribed proper value. As shown in FIG. 9, the cooling water flow control unit 41 is equipped with a thermostat housing 42 and a thermostat 43.

A left housing 42L of the thermostat housing 42 is formed with a first cooling water inlet 44 at a rear position, and with a second cooling water inlet 45 at a left position. The left housing 42L is also formed with a cooling water outlet 46 at a front position. A water temperature sensor S for detecting the temperature of cooling water flowing inside the left housing 42L is attached to the left housing 42L at a rear-left position.

A right housing 42R of the thermostat housing 42 is formed with a cooling water return inlet 47 at a front position, and with a cooling water outlet 48 at a rear position. A cooling water bypass passage 49 is formed between the left housing 42L and the right housing 42R.

The thermostat 43 is disposed inside the right housing 42R. The thermostat 43 adjusts the degree of opening of the flow passage between the cooling water return inlet 47 and the cooling water outlet 48 and the degree of opening of the cooling water bypass passage 49 according to the temperature of cooling water.

As shown in FIGS. 8 and 9, the main tubing 51 is provided to have the cooling water flow control unit 41 and the water pump 30 communicate with each other and to supply cooling water that has cooled the engine 12 to the water pump 30 and the radiator unit 33. That is, the water pump 30, the radiator unit 33, the cooling water flow control unit 41, and the main tubing 51 constitute an engine cooling water circulation structure for circulating cooling water for cooling the engine 12.

The main tubing 51 has a cylinder outlet hose 52, a water pump inlet hose 53, a radiator inlet hose 54, and a radiator outlet hose 55. Except the cylinder outlet hose 52, the main tubing 51 is disposed in a concentrated manner in the space between the engine 12 and the radiator unit 33 (see FIGS. 2 and 3). The hoses 52-55 are made of a flexible synthetic resin, for example.

The cylinder outlet hose 52 connects an outlet portion (not shown) of the water jacket and the first cooling water inlet 44. The water pump inlet hose 53 connects the cooling water outlet 48 and the pump inlet 31 of the water pump 30. The radiator inlet hose 54 connects the cooling water outlet 46 and the radiator inlet 37 of the top radiator 34. The radiator outlet hose 55 connects the radiator outlet 38 of the top radiator 34 and the cooling water return inlet 47.

As shown in FIGS. 9 and 10, the cooling tubing 61 is provided to supply cooling water that has cooled the oil cooler 26 or the supercharger 113 to the water pump 30 and the radiator unit 33. That is, the water pump 30, the radiator unit 33, the cooling water flow control unit 41, and the cooling tubing 61 constitute a supercharger cooling water circulation structure for circulating cooling water for cooling the oil cooler 26 and the supercharger 113.

The cooling tubing 61 has a branching tube 62, a first inflow tube 63, a second inflow tube 64, a first outflow tube 65, a second outflow tube 66, and a merging tube 67. The cooling tubing 61 is disposed in a concentrated manner in the space between the engine 12 and the radiator unit 33 (see FIG. 3). Although it is preferable that the branching tube 62, the first inflow tube 63, the second inflow tube 64, the first outflow tube 65, and the merging tube 67 be hoses made of a flexible synthetic resin, they may be metal pipes.

An upstream end portion of the branching tube 62 is connected to the cooling water outlet 30B of the water pump 30. A downstream end portion of the branching tube 62 branches into the first inflow tube 63 and the second inflow tube 64. The first inflow tube 63 connects the branching tube 62 to the right surface of the oil cooler 26. The second inflow tube 64 connects the branching tube 62 to a bottom portion of the supercharger 113 (bearing unit 116). That is, the second inflow tube 64 is routed parallel with the first inflow tube 63. A downstream end portion of the second inflow tube 64 is connected to a lower inflow pipe 116A which projects from the bottom surface of the bearing unit 116.

The first outflow tube 65 extends up rightward from the oil cooler 26. The second outflow tube 66 extends rightward from a top portion of the bearing unit 116. The first outflow tube 65 and the second outflow tube 66 merge together above the supercharger 113 etc. The second outflow tube 66 has a supercharger outlet pipe 66A and a supercharger outlet hose 66B. An upstream end portion of the supercharger outlet pipe 66A is connected to an upper outflow pipe 116B which projects from the top surface of the bearing unit 116. The supercharger outlet hose 66B is connected to a downstream end portion of the supercharger outlet pipe 66A.

Although it is preferable that the supercharger outlet pipe 66A be made of a metal or the like and the supercharger outlet hose 66B be made of a synthetic resin or the like, the whole of the second outflow tube 66 may be a metal pipe or a synthetic resin hose.

The first outflow tube 65 and the second outflow tube 66 (supercharger outlet hose 66B) merge into the merging tube 67. The merging tube 67 connects the second cooling water inlet 45 and the merging portion of the outflow tubes 65 and 66. The merging tube 67 extends up leftward.

Now, how cooling water flows will be described with reference to FIGS. 9 and 10. Upon a start of the engine 12 (water pump 30), cooling water is fed from the supply portion 30A to the water jacket of the engine 12 and cools the cylinders 14 and the cylinder head 15. The cooling water that has been used for cooling the engine 12 passes through the cylinder outlet hose 52 and flows into the cooling water flow control unit 41 (left housing 42L).

Upon the start of the water pump 30, cooling water is discharged from the cooling water discharge outlet 30B, flows through the branching tube 62, and is divided to flow into the inflow tubes 63 and 64. Cooling water flowing through the first inflow tube 63 is supplied to the oil cooler 26 and cools engine oil there. On the other hand, cooling water flowing through the second inflow tube 64 is supplied to the bearing unit 116 and cools a turbine wheel bearing etc. there.

The cooling water that has been used for cooling the oil cooler 26 passes through the first outflow tube 65, and the cooling water that has been used for cooling the supercharger 113 passes through the second outflow tube 66. The cooling water streams flowing through the respective outflow tubes 65 and 66 merge together into cooling water passing through the merging tube 67, which flows into the left housing 42L.

The thermostat 43 of the cooling water flow control unit 41 controls the flows of cooling water streams according to the temperature of cooling water that has flown into the thermostat housing 42.

Referring to FIG. 9, if, for example, the cooling water temperature is lower than or equal to a prescribed reference temperature T1 (e.g., immediately after a start of the engine 12), the thermostat 43 fully closes the flow passage between the cooling water return inlet 47 and the cooling water outlet 48 and fully opens the cooling water bypass passage 49. At this time, cooling water that has flown in through the cooling water inlets 44 and 45 does not flow into the radiator unit 33 but flows into the right housing 42R from the left housing 42L via the cooling water bypass passage 49. This cooling water passes through the water pump inlet hose 53 and is supplied to the water pump 30. In this manner, a warm-up operation of the engine 12 can be performed efficiently.

If, for example, the cooling water temperature is higher than the reference temperature T1 and lower than or equal to a prescribed reference temperature T2 (T2>T1), the thermostat 43 increases the sectional area of the flow passage between the cooling water return inlet 47 and the cooling water outlet 48 and decreases the sectional area of the flow passage adjacent to the cooling water bypass passage 49 according to a temperature increase of the cooling water. Thus, the flow rate of cooling water passing through the radiator unit 33 is increased as the cooling water temperature increases.

More specifically, cooling water flows out of the left housing 42L into the top radiator 34 via the radiator inlet hose 54. Part of the cooling water is cooled by the top radiator 34, passes through the radiator outlet hose 55, and flows into the right housing 42R. The other part of the cooling water that has flown into the top radiator 34 is supplied to the bottom radiator 35 via the one connecting hose 36 etc. and cooled there. The cooling water that has been cooled by the bottom radiator 35 returns to the top radiator 34 via the other connecting hose 36 etc. and then flows into the right housing 42R via the radiator outlet hose 55.

On the other hand, the cooling water that has flown through the cooling water bypass passage 49 merges, inside the right housing 42R, with the cooling water that has flown through the radiator unit 33, and the resulting cooling water is returned to the water pump 30 via the water pump inlet hose 53.

If, for example, the cooling water temperature is higher than the reference temperature T2, the thermostat 43 fully opens the flow passage between the cooling water return inlet 47 and the cooling water outlet 48 and fully closes the cooling water bypass passage 49. At this time, cooling water existing in the left housing 42L does not flow into the cooling water bypass passage 49 and, instead, flows into the radiator unit 33 and is returned to the water pump 30 via the right housing 42R.

The radiator cap 34B (see FIG. 7) controls the flow of cooling water according to the internal pressure of the radiator unit 33 (i.e., the volume of cooling water).

After a start of the engine 12, the internal pressure of the radiator unit 33 increases as the temperature of cooling water rises (i.e., its volume increases). When the internal pressure of the radiator unit 33 becomes higher than or equal to a prescribed value, the cooling water opens the pressure valve of the radiator cap 34A and flows out of the top radiator 34 into the reservoir tank 59 via the reserve tube 59E. This cooling water is stored in the reservoir tank 59 (tank main body 59A). If the amount of cooling water that has flown into the tank main body 59A exceeds the tank capacity, the excess part of the cooling water flows out of the tank main body 59A to the outside via the overflow tube 59F.

On the other hand, after a stop of the engine 12, the internal pressure of the radiator unit 33 decreases as the temperature of cooling water lowers (its volume decreases). When the internal pressure of the radiator unit 33 becomes lower than a prescribed value, cooling water is sucked and returned from the reservoir tank 59 to the top radiator 34 via the reserve tube 59E.

Incidentally, as shown in FIGS. 2 and 6, the reservoir tank 59 is disposed below the supercharger 113 between the engine 12 and the bottom radiator 35 (when viewed from the side). More specifically, the reservoir tank 59 is disposed below the compressor unit 115 of the supercharger 113. Furthermore, as shown in FIGS. 6 and 7, the reservoir tank 59 is disposed at such a position as to be covered with the bottom radiator 35 when viewed from the front side (or rear side), that is, to be hidden behind the bottom radiator 35.

As shown in FIG. 7, the reservoir tank 59 is fixed to a bottom-left portion of the rear surface of the bottom radiator 35 by the fixing bolt B in a posture that the tank injection inlet 591 is located above. The fixing bolt B is inserted through the attachment piece 592 of the tank main body 59A and threadedly engaged with a female screw portion (not shown) of the bottom radiator 35, whereby the reservoir tank 59 is fixed to the bottom radiator 35. In this state, the left side surface of the reservoir tank 59 conforms to the outline of the bottom-left portion of the bottom radiator 35. That is, the lower part of the left side surface (tapered surface Ta2) of the reservoir tank 59 is approximately in the same plane as the bottom portion of the left side surface (tapered surface Ta1)

of the bottom radiator 35. Likewise, the bottom surface of the tank main body 59A is approximately in the same plane as the bottom surface of the bottom radiator 35.

In the above-described motorcycle 1 according to the embodiment, the space (see FIG. 2) located below the supercharger 113 between the engine 12 (crank case 13) and the bottom radiator 35 can be used effectively as an installation space for the reservoir tank 59. Since the reservoir tank 59 is hidden behind (in the rear of) the bottom radiator 35, the reservoir tank 59 can be protected from flying water, stones, etc. coming from around a front part of the vehicle.

In the motorcycle 1 according to the embodiment, since as shown in FIG. 6 the reservoir tank 59 is located on the side of the compressor unit 115 which is kept lower in temperature than the turbine unit 114, the influence of heat on (the cooling water in) the reservoir tank 59 can be lessened. For example, thermal deformation of the reservoir tank 59, temperature increase of the cooling water stored in the reservoir tank 59, etc. can be suppressed.

Since as shown in FIGS. 6 and 7 the reservoir tank 59 is attached directly to the bottom radiator 35, it is possible to dispense with, for example, a component for supporting the reservoir tank 59 so that it is located in its installation space and to hence decrease the number of assembling steps. Alternatively, the reservoir tank 59 may be fixed to the engine 12 (crank case 13) or the vehicle body frame 211 or fixed via a support component so as to be located between the engine 12 and the bottom radiator 35.

As shown in FIGS. 6 and 7, the reservoir tank 59 goes in the left-right width of the bottom radiator 35, which enables miniaturization of the engine unit 11 having the supercharger 113 and prevents, for example, an event that impact (external force) directly acts on the reservoir tank 59 from the road surface when the vehicle falls.

As shown in FIG. 1, the reservoir tank 59 is disposed inside the lower cowl 245 which covers a bottom portion of the engine 12. The lower cowl 245 covers the part of the engine 12, the bottom radiator 35, and the reservoir tank 59 from below.

With the above structure, since the reservoir tank 59 is covered with the lower cowl 245, the reservoir tank 59 can be protected from flying water, stones, etc. coming from around a front part of, from below, or from the left side or right side of the vehicle. Furthermore, hiding the reservoir tank 59 by the lower cowl 245 improves the design performance.

Figure 12:
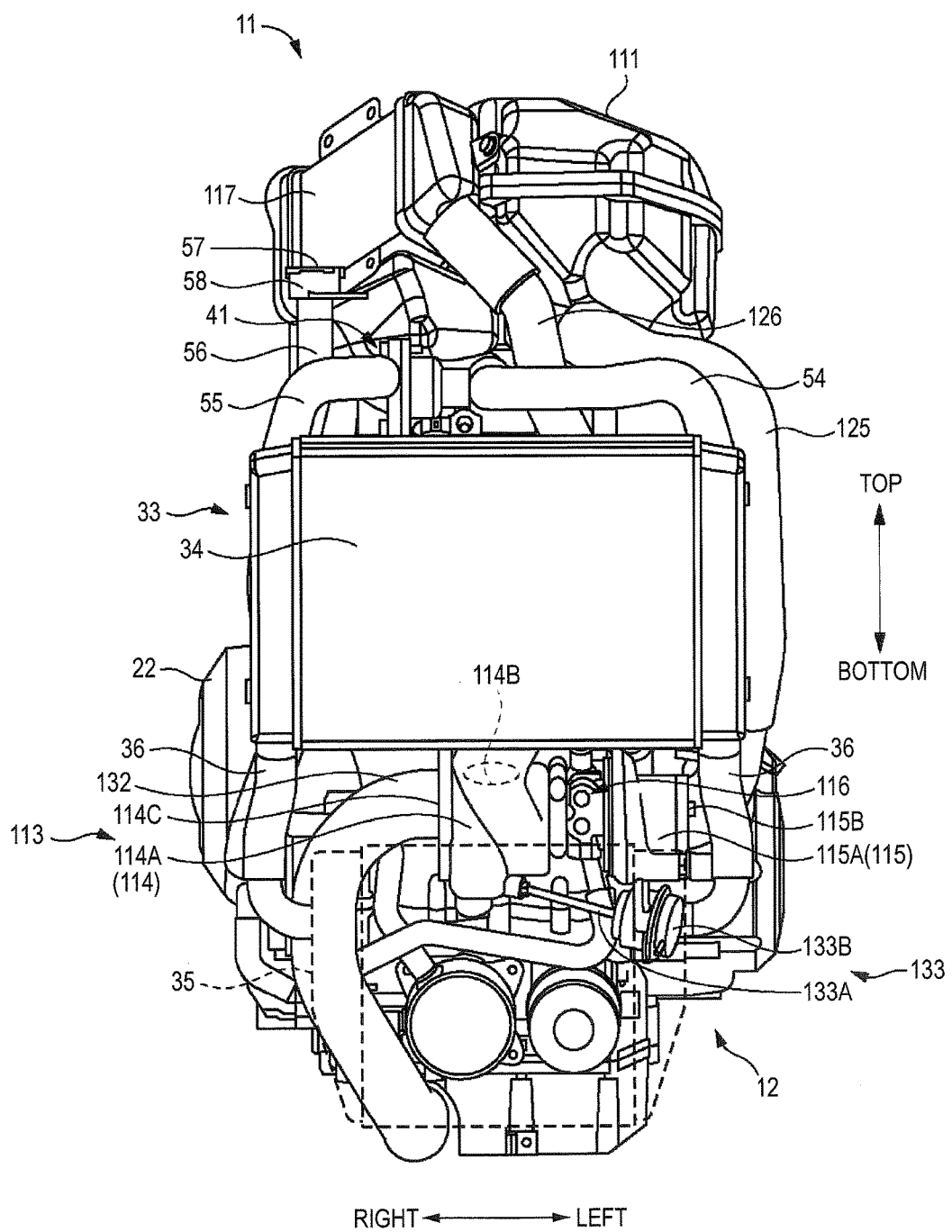
FIG. 12 is another front view of the engine unit, including the radiator unit and excluding the reservoir tank, of the motorcycle according to the embodiment.

Incidentally, as shown in FIGS. 2, 3, 6, and 12, the supercharger 113 and the waste gate valve 133 are disposed between the engine 12 and the radiator unit 33 when viewed from the side. More specifically, the supercharger 113 is disposed at such a position as to be seen from the front side through the space between the top radiator 34 and the bottom radiator 35. The waste gate valve 133 is disposed under the supercharger 113 between the engine 12 (balancer room 18) and the bottom radiator 35 when viewed from the side. As shown in FIG. 12, the waste gate valve 133 is disposed at such a position as to be covered with the bottom radiator 35 when viewed from the front side. That is, the waste gate valve 133 is disposed so as to be hidden behind the bottom radiator 35. Furthermore, as shown in FIG. 1, the waste gate valve 133 is disposed inside the lower cowl 245 which covers the bottom portion of the engine 12. The lower cowl 245 covers the part of the engine 12, the bottom radiator 35, and the waste gate valve 133 from below.

In the above-described motorcycle 1 according to the embodiment, since the supercharger 113 and the waste gate valve 133 are arranged in the vertical direction, the radiator unit 33 can be set closer to the engine 12 than in a case that they are arranged in the front-rear direction. More specifically, since the supercharger 113 is disposed in such a manner that part of it avoids (i.e., is located above) the balancer room 18, the supercharger 113, the waste gate valve 133, and the radiator unit 33 can be set closer to the crank case 13. As a result, the wheelbase of the motorcycle 1 can be shortened.

In the motorcycle 1 according to the embodiment, the waste gate valve 133 is covered with the radiator unit 33 (bottom radiator 35) when viewed from the front side. More specifically, the waste gate valve 133 is disposed above the oil filter 25 and is covered with the radiator unit 33 (bottom radiator 35) when viewed from the front side. The waste gate valve 133 is also covered with the lower cowl 245. As a result, the waste gate valve 133 can be protected from flying water, stones, etc. thrown up by the front tire and coming from around a front part of, from below, or from the left side or right side of the vehicle. Furthermore, since the supercharger 113 is disposed above the balancer room 18 and covered with the lower cowl 245, it can be protected from flying water, stones, etc. coming from below or from the left side or right side of the vehicle.

In the motorcycle 1 according to the embodiment, since the supercharger 113 goes in the width, in the left-right direction (vehicle width direction), of the bottom radiator 35, the engine unit 11 having the supercharger 113 can be miniaturized.

Figure 13:
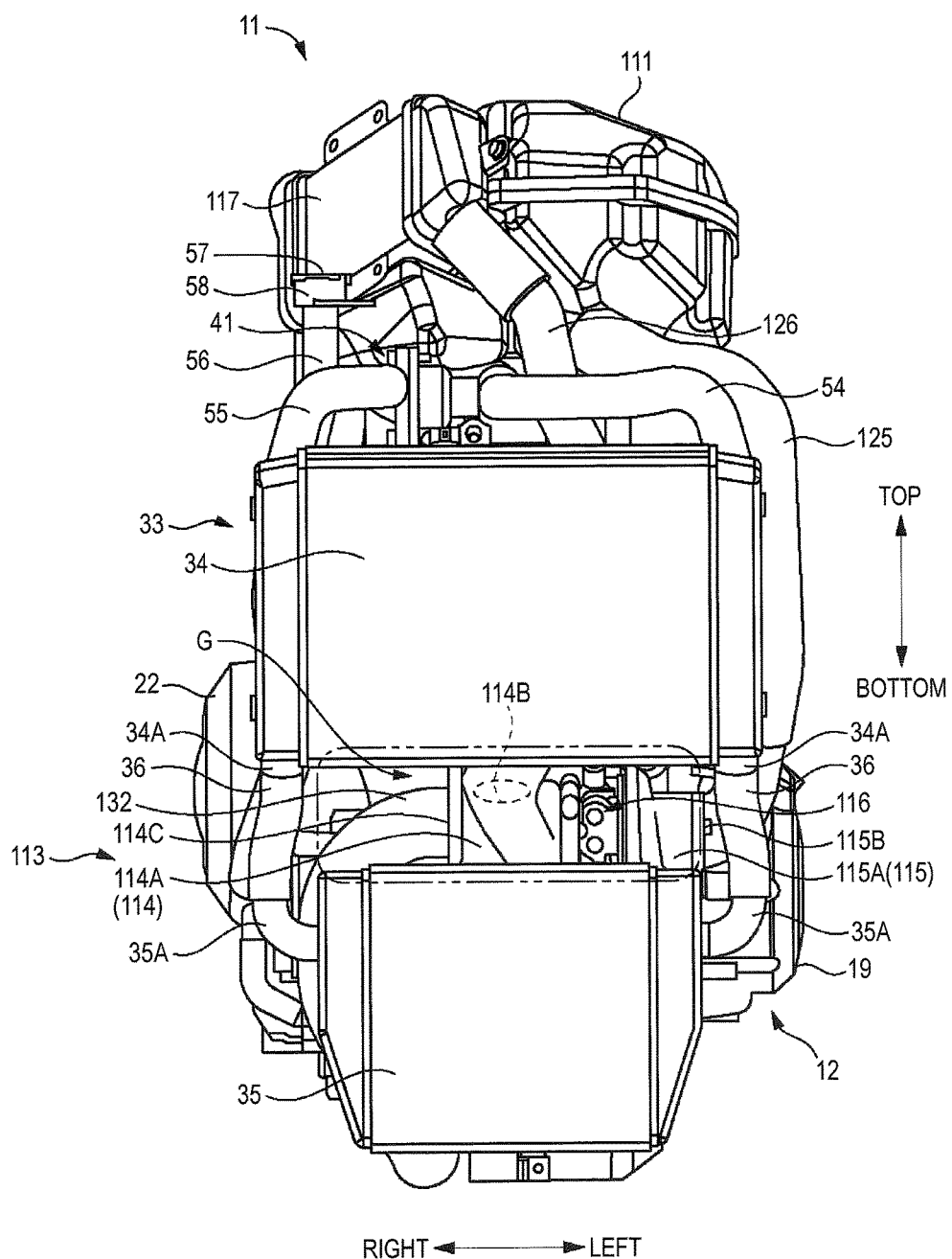
FIG. 13 is another front view of the engine unit, including the radiator unit, of the motorcycle according to the embodiment.

Incidentally, as shown in FIGS. 2 and 3, the supercharger 113 is disposed between the engine 12 and the radiator unit 33 when viewed from the side. And, as shown in FIG. 13, the supercharger 113 is disposed at such a position as to be seen from the front side through a space G between the top radiator 34 and the bottom radiator 35. More specifically, the turbine housing 114A, the exhaust gas outflow portion 114C, the compressor housing 115A, the air inflow portion 115B, and the bearing unit 116 are seen from the front side through the space G. A downstream portion (i.e., a portion in the vicinity of the exhaust gas inflow portion 114B) and an upstream portion (i.e., a portion connected to the exhaust gas outflow portion 114C) of the muffler joint pipe 132 are also seen from the front side through the space G.

In the above-described motorcycle 1 according to the embodiment, the supercharger 113 can directly receive a travel wind because it is disposed between the engine 12 and the radiator unit 33 and is seen through the space between the top radiator 34 and the bottom radiator 35. As a result, the supercharger 113 can be cooled by a travel wind.

Since as shown in FIG. 2 the supercharger 113 is disposed in such a manner that part of it avoids (i.e., is located above) the balancer room 18, the supercharger 113 and the radiator unit 33 can be set closer to the crank case 13. As a result, the front wheel 228 can be disposed at a more rearward position to shorten the wheelbase of the motorcycle 1.

Since the part of the supercharger 113 is disposed above the balancer room 18, the probability of occurrence of a phenomenon that water thrown up sticks to the supercharger 113 can be lowered. Furthermore, since the part of the supercharger 113 is disposed above the balancer room 18, it is possible to, for example, cause engine oil that has been supplied to the bearing unit 116 to drop naturally and return to the oil pan 17. This makes it possible to dispense with a mechanism (e.g., scavenging pump) for returning engine oil that has been used for lubrication of the supercharger 113 to the oil pan 17.

The supercharger 113 including the waste gate valve 133 is disposed in a range (surrounded by a two-dot-chain line in FIG. 13) that is defined by the width, in the left-right direction (vehicle width direction), of the bottom radiator 35 when viewed from the front side. With this structure, since the entire supercharger 113 goes in the range defined by the left-right width of the bottom radiator 35, the engine unit 11 having the supercharger 113 can be miniaturized.

As shown in FIGS. 2, 3, 6, and 13, the pair of upper pipes 34A, the pair of lower pipes 25A, and the pair of connecting hoses 36 (together correspond to the term "pair of connection pipes" used in the claims) are disposed on the left side and the right side of the space between the top radiator 34 and the bottom radiator 35 and hence are spaced from the supercharger 113. As a result, a wide space can be secured behind the radiator unit 33, which increases the degree of freedom routing of the air intake/exhaust pipes (125, 126, 131, and 132) relative to the supercharger 113.

As shown in FIG. 8, the radiator fan 40 is disposed somewhat on the right of the top radiator 34. That is, as shown in FIG. 2, the radiator fan 40 is disposed above the turbine unit 114. With this structure, since the radiator fan 40 is disposed on the side of the turbine unit 114, a wide space can be secured on the rear-left of the top radiator 34 (i.e., on the side of the compressor unit 115). This increases the degree of freedom routing of the air intake pipe 125 and the air outlet pipe 126 which are connected to the compressor unit 115.

Figure 11:
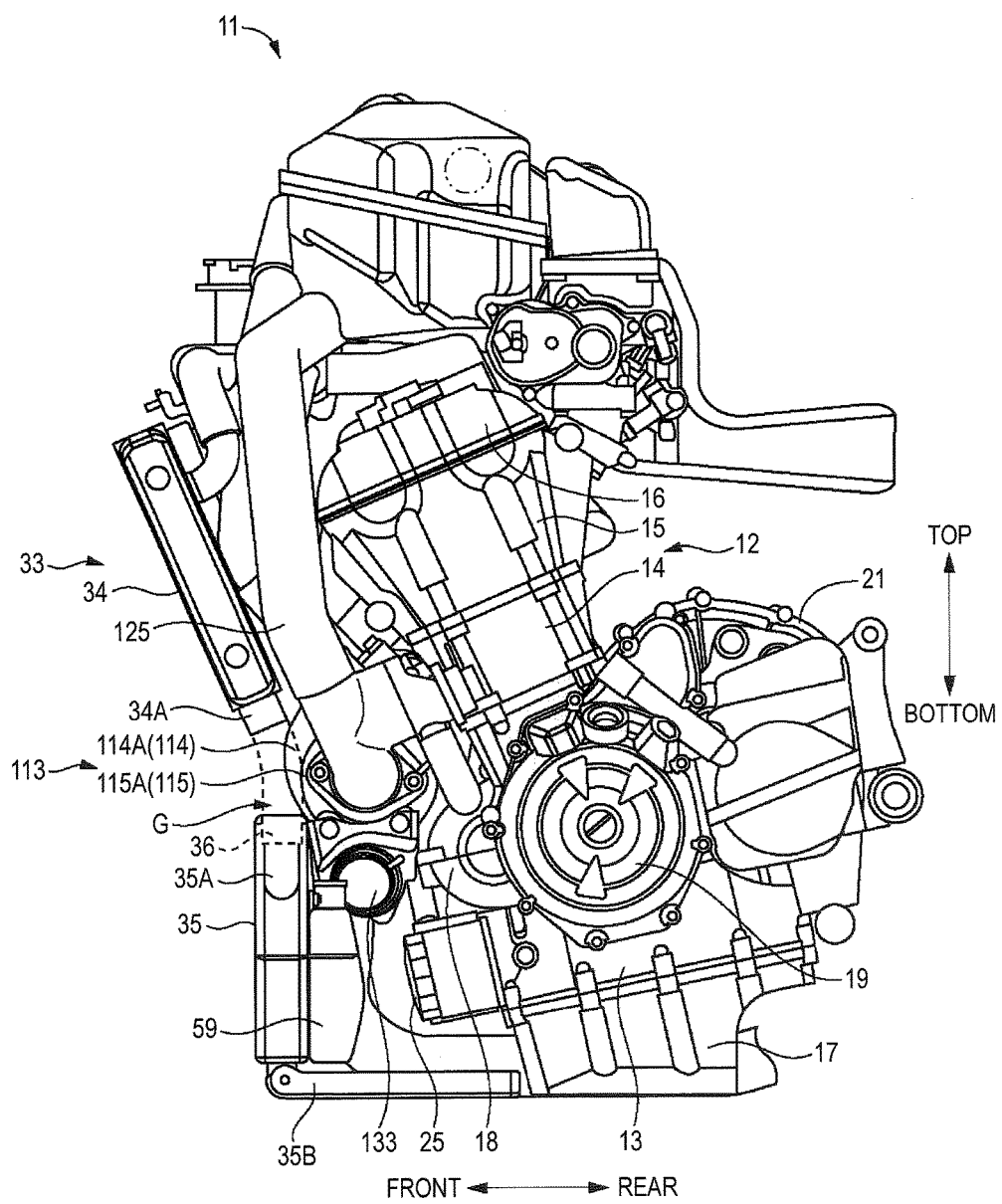
FIG. 11 is a right side view of an engine unit of a motorcycle according to a modification of the embodiment.

Although in the above-described motorcycle 1 according to the embodiment, no part of the supercharger 113 exists in the space G, the invention is not limited to that case. FIG. 11 shows an engine unit 11 of a motorcycle 1 according to a modification of the embodiment. As shown in FIG. 11, a front portion of the supercharger 113 exists in the space G between the top radiator 34 and the bottom radiator 35. More specifically, it is preferable that front portions of the turbine housing 111A and the compressor housing 115A be located in the space G. In this case, it is preferable that the front portion of the supercharger 113 be located in the rear of the upward extension of the front surface of the bottom radiator 35.

In the motorcycle 1 according to the modification of the embodiment, since the front portion of the supercharger 113 exists in the space G between the top radiator 34 and the bottom radiator 35, the radiator unit 33 can be set closer to the engine 12, whereby the wheelbase of the motorcycle 1 can be shortened further.

Although in the embodiment (and its modification) the radiator unit 33 is composed of the top radiator 34 and the bottom radiator 35, the invention is not limited to that case. For example, one of the top radiator 34 and the bottom radiator 35 may be replaced by an intercooler or an air-cooling-type oil cooler.

Although in the embodiment the reservoir tank 59 goes in the left-right width of the bottom radiator 35, the invention is not limited to that case. Where the reservoir tank 59 is of a large capacity or the bottom radiator 35 is small, the reservoir tank 59 may stick out of the bottom radiator 35 when viewed from the front side. The attachment position of the reservoir tank 59 is determined by the bank angle of the motorcycle 1.

Although the embodiment is directed to the case that the invention is applied to a motorcycle, the invention is not limited to that case. For example, the invention may be applied to saddle-ridden motorcycles (e.g., tricycles having two front wheels and one rear wheel) having similar configurations.

The above-described embodiment which is directed to a saddle-ridden vehicle is just one mode of the invention. Each of the constituent elements of the embodiment can be replaced by or combined with an existing element as appropriate, and the embodiment should not be construed as restricting the invention as claimed.

What is claimed is:

1. A saddle-ridden vehicle comprising: an engine; a radiator unit which is disposed in front of the engine and cools cooling water sent from the engine; a supercharger which is disposed between the engine and the radiator unit and compresses air for combustion to be supplied to the engine; and a reservoir tank which is connected to the radiator unit and stores cooling water to flow into the radiator unit, wherein: the radiator unit comprises a top radiator disposed in a top-front area of the engine and a bottom radiator disposed below the top radiator; the reservoir tank is fixed to the bottom radiator and is disposed below the supercharger between the engine and the bottom radiator, wherein: the top radiator is narrower than the engine in the vehicle width direction; the bottom radiator is narrower than the top radiator in the vehicle width direction; and the reservoir tank is disposed at such a position as to be covered with the bottom radiator when viewed from the front side of the engine.

2. The saddle-ridden vehicle according to claim 1, wherein:
the supercharger comprises:
a turbine unit which is disposed in front of a central portion, in a vehicle width direction, of the engine and driven by exhaust gas of the engine; and
a compressor unit which is disposed on one side, in the vehicle width direction, of the turbine unit and compresses air using drive force received from the turbine unit; and
the reservoir tank is disposed below the compressor unit.

3. The saddle-ridden vehicle according to claim 1, wherein the reservoir tank is disposed inside a lower cowl which covers a bottom part of the engine.

4. A saddle-ridden vehicle comprising: an engine; a radiator unit which is disposed in front of the engine and cools cooling water sent from the engine; a supercharger which compresses air for combustion to be supplied to the engine; a valve mechanism which adjusts a pressure of air compressed by the supercharger, wherein: the valve mechanism is disposed under the supercharger between the engine and the radiator unit, wherein: the radiator unit comprises a top radiator disposed in a top-front area of the engine and a bottom radiator disposed below the top radiator so as to be spaced from the top radiator; the valve mechanism is disposed between the engine and the bottom radiator, wherein: the top radiator is narrower than the engine in a vehicle width direction; the bottom radiator is narrower than the top radiator in the vehicle width direction; and the valve mechanism is disposed at such a position as to be covered with the bottom radiator when viewed from the front side.

5. The saddle-ridden vehicle according to claim 4, wherein:
the saddle-ridden vehicle further comprises an oil filter which is disposed in bottom-front of the engine and filters engine oil to be supplied to the engine; and
the valve mechanism is disposed above the oil filter.

6. The saddle-ridden vehicle according to claim 4, wherein:
the engine comprises a crank case which houses a crank shaft which is rotated by a piston which reciprocates in a cylinder;

the crank case comprises a balancer room which houses a balancer shaft which suppresses vibration caused by the rotation of the crank shaft;

the balancer room projects forward from a front portion of the crank case;

part of the supercharger is disposed above the balancer room; and the valve mechanism is disposed in front of the balancer room.

7. The saddle-ridden vehicle according to claim 4, wherein the valve mechanism is disposed inside a lower cowl which covers a bottom part of the engine.

8. A saddle-ridden vehicle comprising: an engine; a supercharger which compresses air for combustion to be supplied to the engine; and a radiator unit which cools cooling water sent from the engine, wherein: the radiator unit comprises a top radiator disposed in a top-front area of the engine and a bottom radiator disposed below the top radiator so as to be spaced from the top radiator; the supercharger is disposed between the engine and the radiator unit at such a position as to be seen from the front side through a space between the top radiator and the bottom radiator, wherein: the top radiator is narrower than the engine in a vehicle width direction; the bottom radiator is narrower than the top radiator in the vehicle width direction; and ends of the supercharger in the vehicle width direction are within a range defined by a length of corresponding ends of the bottom radiator in the vehicle width direction, when viewed from the front side of the engine.

9. The saddle-ridden vehicle according to claim 8, wherein a front portion of the supercharger exists in the space between the top radiator and the bottom radiator.

10. The saddle-ridden vehicle according to claim 8, wherein:

the engine comprises a crank case which houses a crank shaft which is rotated by a piston which reciprocates in a cylinder;

the crank case comprises a balancer room which houses a balancer shaft which suppresses vibration caused by the rotation of the crank shaft;

the balancer room projects forward from a front portion of the crank case; and part of the supercharger is disposed above the balancer room.

11. The saddle-ridden vehicle according to claim 8, wherein:

the top radiator and the bottom radiator are connected to each other by a pair of connection pipes;

one end portions of the pair of connection pipes are connected to bottom surfaces of two end portions, in the vehicle width direction, of the top radiator, respectively, and other end portions of the pair of connection pipes are connected to two side surfaces, in the vehicle width direction, of the bottom radiator, respectively.

12. The saddle-ridden vehicle according to claim 8, wherein:

the saddle-ridden vehicle further comprises a radiator fan which is disposed in the rear of the top radiator;

the supercharger comprises:

a turbine unit which is driven by exhaust gas of the engine; and a compressor unit which compresses air using drive force received from the turbine unit;

the turbine unit is disposed in front of a central portion, in the vehicle width direction, of the engine;

the compressor unit is disposed on one side, in the vehicle width direction, of the turbine unit; and the radiator fan is disposed above the turbine unit.

* * * * *